United States Patent
Williams

(10) Patent No.: US 7,390,414 B2
(45) Date of Patent: Jun. 24, 2008

(54) REGENERATION OF CHEMICALLY TREATED ZEOLITE

(75) Inventor: Charles S. Williams, Golden, CO (US)

(73) Assignee: WRT International LLC, Wheat Ridge, CO (US)

(*) Notice: Subject to any disclaimer, the term of this patent is extended or adjusted under 35 U.S.C. 154(b) by 541 days.

(21) Appl. No.: 11/037,563

(22) Filed: Jan. 18, 2005

(65) Prior Publication Data

US 2005/0150836 A1    Jul. 14, 2005

Related U.S. Application Data

(63) Continuation-in-part of application No. 10/255,364, filed on Sep. 25, 2002.

(60) Provisional application No. 60/537,274, filed on Jan. 15, 2004.

(51) Int. Cl.
    *C02F 1/28* (2006.01)

(52) U.S. Cl. .................. 210/673; 210/679; 210/682; 210/688; 210/912

(58) Field of Classification Search .......... 210/670, 210/673, 679, 682, 688, 912
    See application file for complete search history.

(56) References Cited

U.S. PATENT DOCUMENTS

| | | |
|---|---|---|
| 2,632,720 A | 3/1953 | Perry |
| 3,700,592 A | 10/1972 | Pree |
| 3,723,308 A | 3/1973 | Breck |
| 3,933,631 A | 1/1976 | Adams |
| 4,265,634 A | 5/1981 | Pohl |
| 4,375,568 A | 3/1983 | Izod et al. |
| 4,389,293 A | 6/1983 | Mani et al. |
| 4,686,198 A | 8/1987 | Bush et al. |
| 4,695,387 A | 9/1987 | Berry et al. |
| 4,765,779 A | 8/1988 | Organ |
| 4,800,024 A | 1/1989 | Elfline |
| 4,995,956 A | 2/1991 | Mani |
| 5,043,072 A | 8/1991 | Hitotsuyanagi et al. |
| 5,055,674 A | 10/1991 | Kotrappa |
| 5,084,184 A | 1/1992 | Burns |
| 5,200,046 A | 4/1993 | Chlanda et al. |
| 5,207,914 A | 5/1993 | Lin |
| 5,250,187 A | 10/1993 | Franks |
| 5,268,107 A | 12/1993 | Hutchings et al. |
| 5,512,178 A | 4/1996 | Dempo |

(Continued)

OTHER PUBLICATIONS

Abdo et al., "A new technique for removing hexavalent chromium from waste water and energy generation via galvanic reduction with scrap iron", Energy Conservation and Management, vol. 39, No. 9, pp. 943-951, Jul. 1998. (Abstract).

(Continued)

*Primary Examiner*—Matthew O Savage
(74) *Attorney, Agent, or Firm*—Dorsey & Whitney LLP

(57) ABSTRACT

Systems and methods are provided for the removal and disposal of arsenic from an aqueous medium. The systems and methods include the removal of arsenic from a source by contact with either a chemically treated natural or synthetic zeolite, for example a ferric-loaded zeolite. The spent zeolite is disposed of at an appropriate arsenic disposal site. A system for monitoring and maintaining an arsenic removal/disposal system by an off-site provider is also disclosed.

20 Claims, 14 Drawing Sheets

U.S. PATENT DOCUMENTS

| | | | |
|---|---|---|---|
| 5,556,545 | A | 9/1996 | Volchek et al. |
| 5,575,919 | A | 11/1996 | Santina |
| 5,591,346 | A | 1/1997 | Etzel et al. |
| 5,651,883 | A | 7/1997 | Horwitz et al. |
| 5,679,256 | A | 10/1997 | Rose |
| 5,695,642 | A | 12/1997 | Greenleigh et al. |
| 5,707,514 | A | 1/1998 | Yamasaki et al. |
| 5,711,015 | A | 1/1998 | Tofe |
| 5,725,753 | A | 3/1998 | Harada et al. |
| 5,733,434 | A | 3/1998 | Harada et al. |
| 5,876,685 | A | 3/1999 | Krulik et al. |
| 5,951,874 | A | 9/1999 | Jangbarwala et al. |
| 6,042,731 | A | 3/2000 | Bonnin |
| 6,531,063 | B1 | 3/2003 | Rose |
| 6,582,605 | B2 | 6/2003 | Krulik et al. |
| 6,583,081 | B2 | 6/2003 | Seff |
| 6,613,230 | B2 | 9/2003 | Krulik et al. |
| 6,663,781 | B1 | 12/2003 | Huling et al. |
| 6,753,186 | B2 | 6/2004 | Moskoff |
| 6,849,187 | B2 * | 2/2005 | Shaniuk ...................... 210/688 |
| 7,108,784 | B1 | 9/2006 | Williams et al. |
| 7,261,811 | B2 | 8/2007 | Nakhia et al. |
| 2003/0132155 | A1 | 7/2003 | Litz et al. |
| 2004/0124150 | A1 | 7/2004 | Litz |
| 2005/0222481 | A1 | 10/2005 | Johnson |
| 2005/0236333 | A1 | 10/2005 | Williams et al. |
| 2005/0258102 | A1 | 11/2005 | Litz et al. |
| 2007/0215552 | A1 | 9/2007 | Williams et al. |

OTHER PUBLICATIONS

Ames, L. L., "Zeolitic Removal of Ammonium Ions from Agricultural and Other Wastewaters", 13th Pacific Northwest Industrial Waste Conference, Washington State University, pp. 135-152, 1967.

Barrado et al., "Characterisation of solid residues obtained on removal of Cr from waste water", Journal of Alloys and Compounds, vol. 335, pp. 203-209, Mar. 14, 2002. (Abstract).

Bishop, D. F. et al., "Physical-Chemical Treatment of Municipal Wastewater", Journal of Water Pollution Control Federation, vol. 44, No. 3, pp. 361-371, 1972.

çelik, M. S. et al., "Removal of Ammonia by Natural Clay Minerals Using Fixed and Fluidised Bed Column Reactors", Water Science and Technology: Water Supply, vol. 1, No. 1, pp. 81-88, 2001.

Chmielewska-Horváthová, E., "Advanced Wastewater Treatment Using Clinoptiloite", Environment Protection Engineering, vol. 22, Issue 1-2, pp. 15-22, 1996.

Cooney, E. L. et al., "Ammonia Removal from Wastewaters Using Natural Australian Zeolite. II Pilot-Scale Study Using Continuous Packed Column Process", Separation Science and Technology, vol. 34, Issue 14, pp. 2741-2760, 1999.

Dowex RSC, "Radium Removal from Groundwater with Dowex RSC Radium Selective Complexer Resin", DOWEX Ion Exchange Resins, http://www.dow.com/liquidseps, 2 pp., 2001.

Fazullina et al., "Removal of chromium compounds in the process of coagulation treatment of wool industry dyeing-finishing plant waste water", Soviet Journal of Water Chemistry and Technology, vol. 10, No. 5, pp. 85-88, 1988. (Abstract).

Hagiwara, Z. et al., "Ion-Exchange Reactions of Processed Zeolite and Its Application to the Removal of Ammonia-Nitrogen in Wastes", Natural Zeolites: Occurrence, Properties, Use, International Conference on the Occurrence, Properties, and Utilization of Natural Zeolites, Tucson, Arizona, Pergamon Press, pp. 463-470, 1978.

Han, Ihn Sup, "Environmental engineering parameters affecting the removal of hexavalent chromium and nitroaromatic compounds from water by granular activated carbon", Thesis, 178 pages, 1999. (Abstract).

Haralambous, A. et al., "The Use of Zeolite for Ammonium Uptake", Water Science aand Technology Journal, vol. 25, No. 1, (1992), pp. 139-145.

Hayhurst, D. T., "The Potential Use of Natural Zeolites for Ammonia Removal During Coal-Gasification", Natural Zeolites: Occurrence, Properties, Use, International Conference on the Occurrence, Properties, and Utilization of Natural Zeolites, Tucson, Arizona, Pergamon Press, pp. 503-507, 1978.

Jørgensen, S.E., "Ammonia Removal by Use of Clinoptilolite", Water Research, vol. 10, pp. 213-224, 1976.

Kalló, D., "Wasterwater Purification in Hungary Using Natural Zeolites", Natural Zeolites '93, International Committee Natural Zeolites, Brockport, New York, pp. 341-350, 1993.

Klieve,J. H. et al., "An Evaluation of Pretreated Natural Zeolites for Ammonium Removal", Water Research—The Journal of the International Association on Water Pollution Research, vol. 14, No. 2, Pergamon Press, pp. 161-168, 1980.

Koon, J. H. et al., "Optimization of Ammonia Removal by Ion Exchange Using Clinoptilolite", SERL, Report No. 71-5, University of California, Berkeley, California, pp. 1-189, 1971.

Koon, J. H. et al., "Ammonia Removal from Municipal Wastewaters by Ion Exchange", Journal Water Pollution Control Federation, vol. 47, No. 3, pp. 448-465, 1975.

Kutsy, V. G., "The Removal of Co; 2; +, Ni; 2; +, Cu; 2; +, Zn; 2; +, Mn; 2; +, Fe; 3; +and Cr; 6; + out of Water Solutions by Phosphates of Metals", Ekotekhnologii I Resursosberezhenie, Part 1, pp. 42-45, 2002. (Abstract).

Lin, et al., "The Removal of hexavalent chromium from water by ferrous sulfate", Hazardous and insdustrial wastes: Proceedings of the twenty-seventh Mid-Atlantic industrial waste conference, Technomic Publishing Co., Inc., Lancaster, PA, 1995. (Abstract).

McLaren, J. R. et al., "Factors Affecting Ammonia Removal by Clinoptilolite", Journal of the Environmental Engineering Division, ASCE, vol. 1973, pp. 429-444, 1973.

Melitas et al., "Kinetics of soluble chromium removal from contaminated water by zero valent iron media: corrosion inhibition and passive oxide effects", Environmental Science Technology, vol. 35, No. 19, pp. 3948-3953, 2001. (Abstract).

Mercer, B. W., "Clinoptilolite in Water-Pollution Control", The Ore Bin, vol. 31 No. 11, pp. 209-213, 1969.

Mercer, B. W., "Ammonia Removal from Secondary Effluents by Selective Ion Exchange", Journal Water Pollution Control Federation, vol. 42, No. 2, pp. R95-R107, 1970.

Philipot et al., "Hexavalent Chromium Removal from Drinking Water", Water Science and Technology, vol. 17, No. 6/7, pp. 1121-1132, 1985. (Abstract).

Sarre et al., "Chromium removal in water by modified cellulose", Journal of Water Science, vol. 1, No. 1-2, pp. 55-71, 1988. (Abstract).

Semmens, M. J. et al., "Biological Regeneration of Ammonium-Saturated Clinoptilolite. II The Mechanism of Regeneration and Influence of Salt Concentration", Environmental Science & Technology, vol. 11, pp. 260-265, 1977.

Semmens, M. J. et al. "Nitrogen Removal by Ion Exchange: Biological Regeneration of Clinoptilolite", Journal of the Water Pollution Control Federation, vol. 49, No. 12, pp. 2431-2444, 1977.

Semmens, M. J. et al., "Clinoptilolite Column Ammonia Removal Model", Journal of the Environmental Engineering Division, Proceedings of the American Society of Civil Engineers, vol. 104, No. EE2, pp. 231-244, 1978.

Semmens, M. J. et al., "The Regeneration of Clinoptilolite by Biologically Restored Brine", University of Illinois, Water Resources Center, Research Report No. 139, pp. 1-1 through C-10, 1979.

Semmens, M. J. et al., "Ammonium Removal by Ion Exchange: Using Biologically Restored Regenerant", Journal of Water Pollution Control Federation, vol. 51, Issue 12, (Dec. 1979), pp. 2928-2940.

Semmens, M. J., "Ammonium Removal by Clinoptilolite Using Biologically Assisted Regeneration", 5th International Conference on Zeoliltes, Naples, Florida, pp. 795-804, 1980.

Slechta, A. F. et al., "Water Reclamation Studies at th South Lake Tahoe Public Utility District", Journal of the Water Pollution Control Federation, vol. 39, pp. 787-814, 1967.

Smith, S. A. et al., "Tahoe-Truckee Water Reclamation Plant. First Year Review", Water Reuse Symposium, vol. 2, pp. 1435-1445, 1979.

Svetich, Richard, "Long-Term Use of Clinoptilolite in the Treatment of Sewage at Tahoe-Truckee Sanitation Agency, Truckee, California", Natural Zeolites: Occurrence, Properties, Use, International Conference on the Occurrence, Properties, and Utilization of Natural Zeolites, Red Lion Hotel-Riverside, Boise, Idaho pp. 197-201, 1993.

Townsend, R. P. et al., "Ion Exchange Properties of Natural Clinoptilolite, Ferrierite and Mordenite: 1. Sodium-Ammonium Equilibria", Zeolites, vol. 4, No. 2, pp. 191-195, 1984.

Kosarek, Louis J., "Radionuclide removal from water," Environmental Science & Technology, vol. 13, No. 5, pp. 522-525 (1979).

* cited by examiner

| | | 3000 | pounds | | | | | Initial | |
|---|---|---|---|---|---|---|---|---|---|
| For the contact use | | 1364 | kilograms of dry, plus 35-mesh zeolite, | | | | | Fe, g/L | solids |
| Initial | Add | 2150 | L water plus | 114 | kilograms ferric sulfate | | | 10.6 | 39% |
| Second | Add water to bring vol to 4190 L | | | 178 | kilograms ferric sulfate | | | 16.6 | |

| Contact | L | Filtrate | | | | | | H+ Addn meq/g | Fe, Load meq/g | Displac meq/g |
|---|---|---|---|---|---|---|---|---|---|---|
| | | Fe | Na | Ca | Mg | K | Al | pH | | |
| 11 hr | 2150 | 5425 | 3664 | 598 | 197 | 14 | 897 | 2.23 | | 0.44 | 0.48 |
| 24 hr | 2150 | 4738 | 3537 | 645 | 183 | 14 | 1176 | 2.24 | | 0.50 | 0.52 |
| 48 hr | 2150 | 3514 | 3573 | 584 | 149 | 17 | 1356 | 2.25 | | 0.60 | 0.55 |
| residual | 2150 | 93 | 760 | 131 | 11 | <10 | 64 | | | 0.00 | 0.00 |
| | 2150 | | | | | | | | | 0.00 | 0.00 |
| 80 hr | 2150 | 15870 | 3625 | 830 | 315 | <10 | 1058 | 2.06 | | 0.67 | 0.54 |
| 96 hr | 2150 | 14080 | 3642 | 705 | 301 | <10 | 1162 | 2.07 | | 0.82 | 0.55 |
| 120 hr | 2150 | 11180 | 3535 | 674 | 284 | <10 | 1342 | 2.07 | | 1.06 | 0.57 |

Make up water for treatment. Per 10 gallons tap water, add
0.016 grams sodium arsenate (dibasic, heptahydrate)
7.4 grams calcium chloride (anhydrous)

Sample discharges for analysis daily.
An increment sample between the columns and a composite of the Column B discharge

| Date | Time | Feed Batch made up liters | Analysis Fe mg/l | Ca mg/l | As µg/l | Target Flow mL/min | Col 1 Fe/Z As,µg/l | Column Z Fe+++ zeolite Liters | As µg/l | Fe mg/l | Ca mg/l | Bed Volumes A | B | Loading mg As/kg Z A | B |
|---|---|---|---|---|---|---|---|---|---|---|---|---|---|---|---|
| Grams charged | | 190 | g | | | 206 | ml | | | | | | | | |
| 13-Jul | 12:00 | | <1 | 65 | 120 | 8 | | | | | | | | | |
| 14-Jul | 7:30 | | | | | 8 | <5 | 9.01 | <5 | | | 44 | 22 | 5.5 | 0.0 |
| 15-Jul | 7:30 | | | | | 8 | <10 | 11.32 | <5 | | | 99 | 50 | 12.0 | 0.3 |
| 16-Jul | 7:30 | | | | | | <5 | 11.34 | <5 | | | 154 | 77 | 18.9 | 0.3 |
| 17-Jul | 7:00 | | | | | | <5 | 12.29 | <5 | <1 | <1 | 214 | 107 | 26.3 | 0.3 |
| 18-Jul | 6:40 | | <1 | 54 | 120 | 10 | <5 | 11.71 | 10 | | | 272 | 136 | 33.1 | 0.3 |
| 19-Jul | 7:00 | | | | | | <5 | 11.71 | 15 | | | 329 | 164 | 40.2 | -0.8 |
| 20-Jul | 6:50 | | | | | | 5 | 10.87 | 10 | | | 382 | 191 | 46.8 | -0.6 |
| 21-Jul | 7:30 | | | | | | 5 | 11.65 | 10 | <1 | <1 | 439 | 219 | 53.8 | -0.9 |
| 22-Jul | 7:40 | | | | 115 | 8 | <5 | 11.30 | 10 | | | 494 | 247 | 60.6 | -1.2 |
| 23-Jul | 6:30 | | | | | | 5 | 10.93 | 15 | | | 647 | 273 | 67.0 | -1.8 |
| 24-Jul | 6:45 | | | | | | <5 | 11.80 | 10 | | | 605 | 302 | 73.8 | -2.1 |
| 25-Jul | 6:20 | | | | | | <5 | 10.83 | 10 | | | 657 | 329 | 80.1 | -2.4 |
| 26-Jul | 6:55 | | <1 | 69 | 132 | 4 | 11.00 | <2 | | | | 715 | 358 | 87.0 | -2.3 |
| 27-Jul | 6:50 | | | | | | <2 | 11.13 | <2 | | | 770 | 385 | 94.6 | -2.3 |
| 28-Jul | 7:20 | | | | | | <2 | 11.70 | <2 | | | 827 | 413 | 102.6 | -2.3 |
| 29-Jul | 7:20 | | | | | | <2 | 11.43 | <2 | | | 883 | 441 | 110.6 | -2.3 |
| 30-Jul | 7:00 | | <1 | 69 | 100 | | <2 | 9.92 | <2 | | | 931 | 465 | 117.3 | -2.3 |
| 31-Jul | 6:45 | | | | | 8 | <2 | 11.60 | <2 | | | 988 | 494 | 123.2 | -2.3 |
| 1-Aug | 6:50 | | | | | | <2 | 11.65 | <2 | | | 1044 | 522 | 129.2 | -2.3 |
| 2-Aug | 6:55 | | | | | 8 | <2 | 11.35 | <2 | <1 | 70 | 1100 | 550 | 135.1 | -2.3 |
| 3-Aug | 6:50 | | <1 | 78 | 104 | 8 | <2 | 11.39 | <2 | | | 1155 | 578 | 141.0 | -2.3 |
| 4-Aug | 7:15 | | | | | 8 | 2 | 11.66 | <2 | | | 1212 | 608 | 147.2 | -2.3 |
| 5-Aug | 7:10 | | | | | | <2 | 11.02 | <2 | | | 1266 | 633 | 153.2 | -2.3 |
| 6-Aug | 6:45 | | | | | | 5 | 11.19 | <2 | <1 | 77 | 1320 | 680 | 158.9 | -2.0 |
| 7-Aug | 6:55 | | <1 | 78 | 80 | 8 | <2 | 12.32 | 2 | | | 1381 | 690 | 165.5 | -2.0 |
| 8-Aug | 6:30 | | | | | | 4 | 11.74 | <2 | | | 1438 | 719 | 170.2 | -1.9 |
| 9-Aug | 6:45 | | | | | 8 | <2 | 11.98 | <2 | | | 1498 | 748 | 175.2 | -1.9 |

FIG.7A

| Date | Time | Feed Batch made up liters | Feed Batch Analysis Fe mg/l | Feed Batch Analysis Ca mg/l | Feed Batch Analysis As µg/l | Target Flow mL/min | Col1 Fe/Z As,µg/l | Column Z Fe+++ zeolite Liters | Column Z Fe+++ zeolite As µg/l | Column Z Fe+++ zeolite Fe mg/l | Column Z Fe+++ zeolite Ca mg/l | Bed Volumes A | Bed Volumes B | Loading mg As/kg Z A | Loading mg As/kg Z B |
|---|---|---|---|---|---|---|---|---|---|---|---|---|---|---|---|
| 10-Aug | 6:30 | | | | | | <2 | 11.09 | <2 | <1 | 78 | 1550 | 776 | 179.7 | -1.9 |
| 11-Aug | 7:00 | | <1 | 4 | 116 | 8 | 4 | 11.78 | <2 | | | 1608 | 804 | 184.4 | -1.8 |
| 12-Aug | 6:50 | | | | | | 6 | 11.33 | <2 | | | 1663 | 832 | 191.0 | -1.5 |
| 13-Aug | 6:40 | | | | | | 14 | 10.71 | <2 | | | 1715 | 858 | 196.7 | -0.9 |
| 14-Aug | 6:30 | | | | | | 10 | 10.34 | <2 | <1 | 4 | 1766 | 883 | 202.5 | -0.4 |
| 15-Aug | 6:45 | | <1 | 80 | 80 | | 24 | 11.28 | <2 | | | 1821 | 910 | 208.0 | 0.9 |
| 16-Aug | 6:50 | | | | | | 34 | 11.02 | <2 | | | 1875 | 937 | 212.7 | 2.7 |
| 17-Aug | 6:45 | | | BREAKTHROUGH | | | 34 | 11.25 | <2 | BREAK- | | 1929 | 965 | 217.6 | 4.6 |
| 18-Aug | 8:45 | | | | | | 32 | 12.16 | <2 | THROUGH | | 1989 | 994 | 222.9 | 6.6 |
| 19-Aug | 7:45 | | <1 | 78 | 70 | | 30 | 10.61 | <2 | <1 | 78 | 2040 | 1020 | 227.7 | 6.1 |
| 20-Aug | 7:00 | | | | | | 34 | 11.08 | <2 | | | 2095 | 1047 | 232.5 | 10.0 |
| 21-Aug | 6:45 | | | | | | 22 | 11.64 | <2 | | | 2151 | 1078 | 238.3 | 11.2 |
| 22-Aug | 6:50 | | | | | | 24 | 11.84 | <2 | <1 | 79 | 2209 | 1105 | 244.0 | 12.6 |
| 23-Aug | 6:20 | | <1 | 35 | 44 | | 28 | 10.27 | | | | 2259 | 1130 | 248.8 | 14.1 |
| 24-Aug | 7:05 | | | | | | 32 | 12.4 | <2 | | | 2320 | 1160 | 254.3 | 16.1 |
| 25-Aug | 7:15 | | | | | | 31 | 11.37 | | | | 2375 | 1188 | 259.3 | 17.9 |
| 26-Aug | 7:45 | | | | | | 30 | 11.56 | <2 | | | 2432 | 1216 | 264.6 | 19.6 |
| 27-Aug | 6:50 | | <1 | 34 | 54 | | 30 | 11.14 | | | | 2486 | 1243 | 269.6 | 21.4 |
| 28-Aug | 7:15 | | | | | | 30 | 11.72 | <2 | | | 2543 | 1272 | 274.9 | 23.1 |
| 29-Aug | 6:45 | | | | | | 28 | 10.98 | | | | 2597 | 1298 | 280.0 | 24.7 |
| 30-Aug | 7:00 | | | | | | 28 | 11.38 | <2 | | | 2652 | 1326 | 265.4 | 26.2 |
| 31-Aug | 6:55 | | | | | | | 12.01 | | | | | | | |
| 1-Sep | 9:00 | | | | | | | 12.99 | | | | | | | |
| 2-Sep | 6:45 | | | | | | | 10.99 | | | | | | | |
| 3-Sep | 7:00 | | | | | | | 11.88 | | | | | | | |

FIG.7B

Add second head to Masterflex pump to pump to Column C

Use same make-up water as Column A
Sample discharges for analysis daily

| Date | Time | made up liters | Feed Batch Analysis, µg/l | | | Target Flow | Column C Fe+++ zeolite | | | | Bed Volumes | Loading Zeolite mg/kg |
|---|---|---|---|---|---|---|---|---|---|---|---|---|
| | | | Fe,mg/L | Ca,mg/L | As,µg/l | mL/min | Liters | As,µg/l | e,mg/l | Ca,mg/L | | |
| Grams charged | | 200 g | | | | 235 ml | | | | | | |
| 21-Jul | | | | | | 8 | | | | | | |
| 22-Jul | 8:00 | | | | 115 | 8 | 10.95 | 10 | | | 47 | 6 |
| 23-Jul | 6:30 | | | | | 8 | 11.06 | <5 | | | 94 | 12 |
| 24-Jul | 6:45 | | | | | 8 | 11.95 | <5 | | | 145 | 18 |
| 25-Jul | 6:20 | | | | | 8 | 11.58 | 10 | | | 194 | 24 |
| 26-Jul | 6:55 | | <1 | 69 | 132 | 8 | 12.23 | <2 | <1 | 67 | 246 | 31 |
| 27-Jul | 6:50 | | | | | 8 | 11.35 | <2 | | | 294 | 39 |
| 28-Jul | 7:20 | | | | | 8 | 11.89 | <2 | | | 345 | 46 |
| 29-Jul | 7:20 | | | | | 8 | 11.72 | <2 | | | 395 | 54 |
| 30-Jul | 0:00 | | <1 | 69 | 100 | 8 | 10.35 | <2 | | | 439 | 61 |
| 31-Jul | 6:45 | | | | | 8 | 12.47 | <2 | | | 492 | 67 |
| 1-Aug | 6:50 | | | | | 8 | 11.90 | <2 | | | 542 | 73 |
| 2-Aug | 6:55 | | | | | 8 | 11.31 | <2 | <1 | 70 | 590 | 78 |
| 3-Aug | 6:50 | | <1 | 78 | 104 | 8 | 10.08 | <2 | | | 533 | 83 |
| 4-Aug | 7:15 | | | | | 8 | 10.74 | <2 | | | 679 | 89 |
| 5-Aug | 7:10 | | | | | 8 | 10.70 | <2 | | | 726 | 94 |
| 6-Aug | 6:45 | | | | | 8 | 10.98 | <2 | <1 | 78 | 771 | 100 |
| 7-Aug | 6:55 | | <1 | 78 | 80 | 8 | 11.32 | <2 | | | 619 | 106 |
| 8-Aug | 6:30 | | | | | | 11.19 | <2 | | | 867 | 110 |
| 9-Aug | 6:45 | | | | | | 11.64 | <2 | | | 917 | 114 |
| 10-Aug | 6:30 | | | | | 8 | 11.03 | <2 | <1 | 79 | 964 | 119 |
| 11-Aug | 7:00 | | <1 | 4 | 116 | | 11.90 | <2 | | | 1014 | 123 |
| 12-Aug | 6:50 | | | | | 8 | 11.44 | <2 | | | 1068 | 130 |
| 13-Aug | 6:40 | | | | | | 11.47 | <2 | | | 1112 | 136 |
| 14-Aug | 6:30 | | | | | | 11.52 | 6 | | | 1161 | 143 |
| 15-Aug | 6:45 | | <1 | 80 | 80 | | 11.12 | <2 | | | 1208 | 149 |
| 16-Aug | 6:50 | | | | | | 11.27 | <2 | | | 1256 | 166 |
| 17-Aug | 6:45 | | | | | | 11.33 | <2 | | | 1304 | 162 |
| 18-Aug | 8:45 | | | | | | 12.35 | 26 | | | 1357 | 168 |
| 19-Aug | 7:45 | | <1 | 78 | 70 | | 11.28 | 30 | | | 1405 | 172 |
| 20-Aug | 7:00 | | | | | | 11.64 | 28 | | | 1454 | 178 |

BREAKTHROUGH

FIG.8A

| Date | Time | Feed Batch made up liters | Analysis, µg/l Fe,mg/L | Ca,mg/L | As,µg/l | Target Flow mL/min | Column C Fe+++ zeolite Liters | As,µg/l | e,mg/ | Ca,mg/L | Bed Volumes | Loading Zeolite mg/kg |
|---|---|---|---|---|---|---|---|---|---|---|---|---|
| 21-Aug | 6:45 | | | | | | 11.98 | 28 | | | 1505 | 183 |
| 22-Aug | 6:50 | | | | | | 12.23 | 24 | | | 1557 | 188 |
| 23-Aug | 6:20 | | <1 | 35 | 44 | | 11.35 | 26 | | | 1605 | 194 |
| 24-Aug | 7:05 | | | | | | 13.17 | 28 | | | 1661 | 199 |
| 25-Aug | 7:15 | | | | | | 12.18 | 27 | | | 1713 | 205 |
| 26-Aug | 7:45 | | | | | | 11.58 | 26 | | | 1762 | 210 |
| 27-Aug | 6:50 | | <1 | 34 | 54 | | 10.97 | 25 | | | 1809 | 215 |
| 28-Aug | 7:15 | | | | | | 11.89 | 24 | | | 1860 | 220 |
| 29-Aug | 6:45 | | | | | | 11.05 | 23 | | | 1907 | 226 |
| 30-Aug | 7:00 | | | | | | 10.97 | 22 | | | 1953 | 231 |
| 31-Aug | 6:55 | | | | | | 13.14 | | | | | |
| 1-Sep | 9:00 | | | | | | 14.00 | | | | | |
| 2-Sep | 6:45 | | | | | | 11.56 | | | | | |
| 3-Sep | 7:00 | | | | | | 11.84 | | | | | |
| 4-Sep | 7:45 | | | | | | 11.54 | | | | | |
| 5-Sep | 6:45 | | | | | | 7.66 | | | | | |
| 6-Sep | 6:45 | | | | | | 10.87 | | | | | |

FIG.8B

REGENERATION OF CHEMICALLY TREATED ZEOLITE

CROSS REFERENCE TO RELATED APPLICATIONS

The present patent application is a continuation-in-part of U.S. patent application Ser. No. 10/255,364, filed on Sep. 25, 2002, entitled ARSENIC REMOVAL FROM AQUEOUS MEDIA USING CHEMICALLY TREATED ZEOLITE MATERIALS, which is incorporated herein by reference. The present application also claims priority to U.S. Provisional Application Ser. No. 60/537,274, filed on Jan. 15, 2004, entitled ARSENIC REMOVAL FROM AQUEOUS MEDIA USING CHEMICALLY TREATED ZEOLITE MATERIALS, which is incorporated herein by reference.

FIELD OF THE INVENTION

The invention generally relates to the removal of arsenic and other target materials, i.e., analytes, from aqueous media. More specifically, the invention provides systems and methods for cost effectively removing arsenic from water as it is treated in a water treatment facility, and in particular, to systems and methods for the removal and disposal of arsenic from drinking water by contacting the water with chemically treated zeolite materials before or after the water has been purified in a water treatment facility.

BACKGROUND OF THE INVENTION

Cities and towns throughout the world depend on having clean potable water supplies. The dependence on clean water has increased as the population of the world has increased, especially as industrial use of rivers and lakes have become commonplace.

The explosion of world population, and corresponding increase in fresh water use, has, therefore, resulted in a need to maximize water usage. However, the ability to maximize fresh water use has been limited by, (1) increased pollution of the fresh water supplies due to higher industrial output throughout the world (a direct result of the increased population); and (2) increased knowledge and standards for what constitutes clean water, acceptable for use in farming, industry, and consumption. As a result, there is a current need to increase the efficiency in the use of water, i.e., conserve existing clean water supplies, increase the current capabilities used to remove pollutants from water supplies, and increase the effectiveness of existing and new technologies to effectively treat and reach new standards in water quality.

In order to facilitate an understanding of clean water concerns in relation to a pollutant, arsenic will be discussed. Arsenic, a soluble element that occurs naturally, has become of concern to the water supplies of many population centers throughout the world, and in particular, portions of the world where the element is found in high concentrations, e.g., Bangladesh, Northern Chile, etc. Of particular importance to these areas of high arsenic concentration, and to other lower arsenic concentration areas as well, is the fact that arsenic has been found to be a toxin and carcinogen and accumulates within tissues over a period of time.

The drinking water standard for arsenic, set in the 1940's, was originally 50 parts per billion (ppb). Over the last several decades, the Environmental Protection Agency (EPA) and academia have been studying the potential health effects of arsenic intake, and in particular have focused on the health effects of arsenic in and around the EPA set level of 50 ppb. For example, at arsenic levels of around 100 ppb there appear to be potential serious health effects on humans, such as increased potential of certain cancers and a weakened immune system. However, at arsenic levels closer to 50 ppb and lower, the studies show conflicting results as to arsenic's effects on health, suggesting that additional studies are needed to clarify what level of arsenic is appropriate for long term consumption in drinking water.

In the 1990's the EPA recommended that the arsenic limit in drinking water be lowered to 10 ppb. No action was taken on the EPA's proposal until days before the Clinton administration was scheduled to leave office, at which time President Clinton approved of arsenic levels being lowered from 50 ppb to 10 ppb. In addition, wide spread support for further lowering the standard to 5 ppb arsenic has gained acceptance within a number of environmental groups. There are a significant number of drinking water facilities that would violate an arsenic standard lower than the 50 ppb standard. In particular, over 3,500 drinking water facilities in at least 24 states would violate a 5 ppb arsenic standard, illustrating the need for utilizing some type of arsenic removal system in at least these facilities.

Currently, commercial scale removal of arsenic is accomplished using granulated ferric oxide and activated alumina, or to a lesser extent, by using ferric hydroxide. Although theoretically effective at arsenic removal, these techniques are costly, tending to run in the range of $1,200/ton for the activated alumina or for the ferric hydroxide, thereby making their use less attractive. Additionally, granular ferric hydroxide has proven to be friable, adding to the cost of using the compound, and activated alumina has proven to have a higher affinity for fluorine than arsenic, making high fluorine water sources unacceptable targets for the activated alumina technique. As such, there is a need in the industry for providing an arsenic removal system that overcomes these current deficiencies in arsenic removal, and has the ability to sufficiently treat water supplies and reach the proposed MCL for arsenic, whether it be 10 ppb or 5 ppb. Ideally these new arsenic removal techniques are cost effective and useful in high fluorine containing water supplies. Against this backdrop the present invention has been developed.

BRIEF SUMMARY OF THE INVENTION

The present invention provides systems and methods for the removal of arsenic from an aqueous medium using the exchange properties of chemically treated zeolite materials. The chemically treated zeolites of the present invention absorb arsenic at levels sufficient to comply with the current MCL for drinking water, as promulgated by the Environmental Protection Agency. Spent zeolites are replaced and disposed of at arsenic approved landfills. Preferably, the chemically treated zeolites have ferric iron absorbed at a sufficient level to provide a high arsenic capacity zeolite material for use in removing arsenic from water sources throughout the United States and world.

The present invention also provides systems and methods for optimizing the working capacity of chemically treated zeolite materials by selectively regenerating the chemically treated zeolite to release non-arsenic or other non-analyte materials. In particular, the present invention provides compositions and methods for reactivating spent chemically treated zeolite to enhance or facilitate further loading of the chemically treated zeolite material with arsenic, uranium or other like material, thereby increasing the maximal loading capacity of the zeolite. Selective removal of contaminant materials from the chemically treated zeolite occurs using acid wash conditions that dissociate a number of non-analyte contaminants, without interfering with the target analyte bound to sites contained in the chemically treated zeolite.

The present invention also provides a system for operating an arsenic removal facility, in accordance with the present invention, from an off-site location. The system includes providing a pre-determined amount of chemically treated zeolite for removal of arsenic from the target water source, monitoring the feed and discharge of the target water source for arsenic levels, modifying the capacity of the chemically treated zeolite to remove arsenic from the feed by replacing an amount of spent chemically treated zeolite with fresh chemically treated zeolite when appropriate amounts of bed volumes, time or discharge readings have been attained, and disposing of the spent zeolite in an arsenic approved landfill. Typically, the operating of the arsenic removal facility is performed at a water treatment facility.

These and various other features as well as advantages which characterize the invention will be apparent from a reading of the following detailed description and a review of the appended claims.

BRIEF DESCRIPTION OF THE DRAWINGS

FIGS. 7A-C are tabular (7A & 7B) and graphical (7C) representations of the feed and discharge arsenic levels in a water source as the water source is circulated over the chemically treated zeolite of the present invention for a number of bed volumes.

FIGS. 8A & 8B illustrate arsenate removal from an aqueous medium in accordance with one embodiment of the present invention

DETAILED DESCRIPTION OF THE INVENTION

Figure 1:
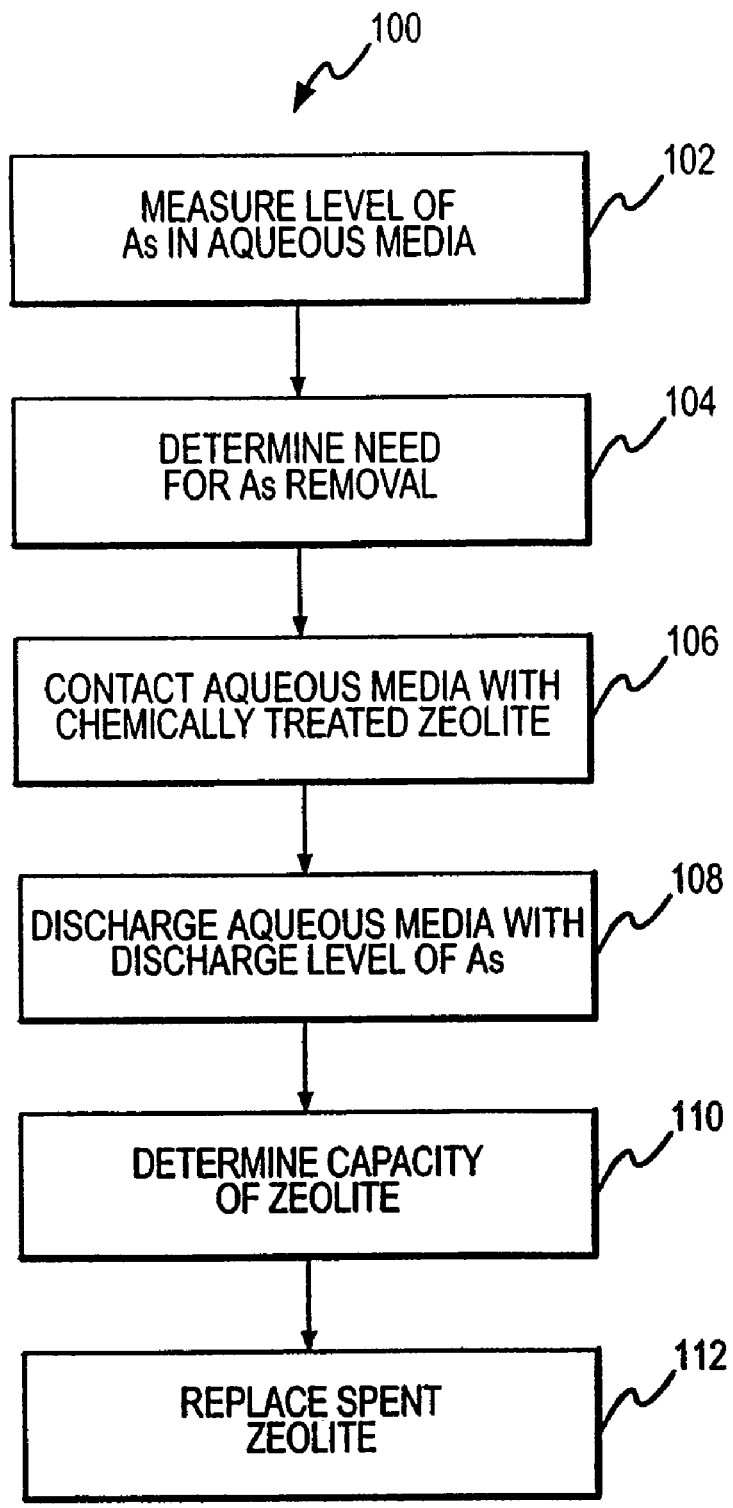
FIG. 1 illustrates a flow diagram of a method for removing arsenic from an aqueous media in accordance with an embodiment of the present invention.

Definitions:

The following definitions are provided to facilitate understanding of certain terms used frequently herein and are not meant to limit the scope of the present disclosure.

"Analyte" refers to a contaminate being detected or removed from an aqueous medium using the methods and compositions of the present invention. Illustrative analytes in this regard include: arsenic, uranium, chromium and other like materials, i.e., via charge and size. A target analyte is the analyte being specifically detected and/or removed from an aqueous medium, so for example, a target analyte could be arsenic in a ground-water supply.

"Aqueous medium" refers to water or any liquid made from, with, or by water.

"Feed" refers to an aqueous medium before treatment with the systems and methods of the present invention, for example, a flowing water source before it enters a water treatment facility.

"Arsenic" or "As" refers to, in general, a nonmetallic element of atomic number 33, having valences of 2, 3, and 5. Arsenic is a known carcinogen and mutagen. For purposes of the present invention, the term arsenic includes arsenate ($AsO_4$) and arsenite ($AsO_3$).

"Maximum Contaminant Level" is the highest level of contamination that is allowed in drinking water in the United States, taking into account best treatment technology and cost. These standards are typically enforceable. Note that Maximum Contaminant Level standards are envisioned to encompass or correspond to the same approximate standards in countries outside the United States, and in may cases are enforceable in those countries. The MCL for arsenic in the United States is 10 ppb.

"Zeolite" refers to a natural and/or synthetic zeolite. Natural zeolites are hydrated silicates of aluminum and either sodium or calcium or both, for example clinoptilolite and chabazite. Synthetic zeolites are made by a number of well known processes, for example gel or clay processes, which form a matrix to which the zeolite is added. Example synthetic zeolites include Linde® AW-30 and Zeolon® 900.

"Approved landfill" refers to any governmentally approved arsenic waste handling facility.

"arsenic measuring device" refers to any detection device having the capacity to detect the level of arsenic in an aqueous medium, for example, Inductively Coupled Plasma spectroscopy (ICP).

"bed volume" for a particular housing member refers to the volume of chemically treated zeolite in the housing member. The term bed volume, for purposes of the present invention, also refers to the retention volume and/or specific retention volume. Note that bed volume has units of liters, cubic meters, or cubic feet.

"Remove" refers to the detectable decrease of a target material, for example arsenic, from a source, for example ground water. Typically removal of arsenic from an aqueous source is at least 50%, preferably at least 75% and most preferably at least 90%, from the original levels in the zeolite treated source.

"Absorb" and "adsorb" refer to the same basic principle of one substance being retained by another substance. The processes can include attraction of one substance to the surface of another substance or the penetration of one substance into the inner structure of another substance. The present invention contemplates that chemically treated zeolite can either absorb and/or adsorb arsenic out of an aqueous medium and that for purposes of the present invention, that the two principles be interchangeable. Other terms used to describe this interaction include binding or trapping, each of which contemplate absorption and/or adsorption.

Generation of Chemically Treated Zeolites

In preferred embodiments of the present invention, a chemically treated zeolite is provided for removal of arsenic from an aqueous medium.

Zeolites:

Compositionally, zeolites are similar to clay minerals, where zeolites are natural hydrated silicates of aluminum and either sodium or calcium or both. Unlike clays, which have a layered crystalline structure (similar to a deck of cards that is subject to shrinking and swelling as water is absorbed), zeolites have a rigid three-dimensional crystalline structure. Zeolites' rigid honeycomb-like crystalline structure consists of a network of interconnected tunnels and cages, thereby forming a series of substantially uniformly sized pores. Aqueous media moves freely in and out of the pores formed by the crystalline structure, making zeolite an excellent sieving or filtration type material, as well as providing a large surface area for binding target ions. Zeolite is host to water molecules and ions or potassium, sodium, and calcium, as well as a variety of other positively charged ions, but only those of appropriate molecular size fit into the pores, creating the "sieving" property.

There are approximately fifty different types of natural zeolites, including clinoptilolite, chabazite, phillipsite, mordenite, analcite, heulandite, stilbite, thomosonite, brewsterite, wellsite, harmotome, leonhardite, eschellite, erionite, epidesmine, and the like. Differences between the different zeolites include particle density, cation selectivity, molecular pore size, and cation affinity. For example, clinoptilolite, the most common natural zeolite, has 16% more void volume and pores as much as 0.2 nm larger than analcime, another common zeolite.

Zeolites having particle sizes from 10×60 mesh, and preferably 20×40 mesh are useful in the present invention, although slightly larger and smaller sized zeolite can be used, just less effectively. Zeolite fines are typically removed before use in the present invention to prevent plugging in the tanks of the present invention (see below). Preferable natural zeolites for use in the present invention include clinoptilolite.

Tables 1 and 2 provide a list of companies that presently produce zeolite minerals in either the United States or Canada. Table 1 provides a chemical analysis of the zeolite materials by company, and Table 2 provides the physical properties of the corresponding zeolite materials for each company. These Tables are provided as illustrative of the types of zeolite material that can be purchased for large scale use in the preparation of chemically treated zeolite.

TABLE 1

| | | Chemical Analysis (Expressed in Weight %) | | | | | | | |
|---|---|---|---|---|---|---|---|---|---|
| Company | Location | $Na_2O$ | $K_2O$ | CaO | MgO | $SiO_2$ | $Al_2O_3$ | $TiO_2$ | $Fe_2O_3$ |
| Addwest Minerals | WY | 4.7 | 1.9 | 1.6 | 0.65 | 74.0 | 14.0 | 0.1 | 2.1 |
| American Research | NV/CA | 3.5 | 3.8 | 0.7 | 0.4 | 69.1 | 11.9 | — | 0.74 |
| Am. Absorbents | OR | 0.8 | 3.8 | 0.7 | 0.4 | 69.1 | 11.9 | 0.2 | 0.7 |
| Stellhead Res. | CA/NM/OR | 0.8 | 3.8 | 0.7 | 0.4 | 69.1 | 11.9 | 0.2 | 0.4 |
| Teague Minerals | OR | 0.9 | 4.7 | 1.4 | 0.3 | 64.1 | 11.8 | 0.3 | 2.58 |
| Zeotech | TX | 0.6 | 1.7 | 2.4 | 0.7 | 68.4 | 12.1 | NK | NK |
| St. Cloud Mining | NM | 0.9 | 3.3 | 3.3 | 1.0 | 64.7 | 12.6 | 0.2 | 1.8 |
| W-Way Zeolites | Canada | 2.5 | 2.7 | 3.4 | 1.3 | 65.8 | 14.3 | 0.3 | 2.6 |
| Highwood Res | Canada | 2.78 | 2.79 | 3.78 | 0.95 | 64.5 | 13.7 | 0.27 | 2.19 |
| C2C Mining | Canada | 1.35 | 1.57 | 2.51 | 1.55 | 66.8 | 11.2 | 0.6 | 5.2 |

TABLE 2

| | Physical Properties | | | | | | | |
|---|---|---|---|---|---|---|---|---|
| Company | Ionic Exch Capacity (meq/g) | $H_2O$ % Adsorp | Free Silica (%) | SG | Color | pH | Pore Diam. (Å) | Hard |
| Addwest Minerals | 2.00 | 14.0 | 2.00 | 1.5 | pale blue | | 4.4 | 3.7 |
| American Research | 1.85 | 12.3 | NK | NK | | | 4.0 | 5.1 |
| Am. Absorbents | 1.4 | | 1.50 | 2.3 | white | 8.0 | 4.0 | 3.8 |
| Stellhead Res. | 1.30 | | 0.09 | 1.6 | white | 8.0 | 4.0 | 5.1 |
| Teague Minerals | 1.77 | | low | 2.2 | off white | | not provided | not provided |
| Zeotech | | | | | | | | |
| St. Cloud Mining | 1.60 | | 0.01< | 2.3 | white | 8.0 | 4.0 | 3.8 |
| W-Way Zeolites | 1.00 | 25.0 | NK | 2.4 | off white/ pale green | 8.1 | 6.5 | NK |

TABLE 2-continued

Physical Properties

| Company | Ionic Exch Capacity (meq/g) | H$_2$O % Adsorp | Free Silica (%) | SG | Color | pH | Pore Diam. (Å) | Hard |
|---|---|---|---|---|---|---|---|---|
| Highwood Res | 1.00 | | 10.0 | 2.0 | | 7.0 | | |
| C2C Mining | NK | NK | 5.00 | 2.3 | brown | 5.0? | NK | NK |

It is also envisioned that synthetic zeolites can be used in accordance with the present invention. Synthetic zeolites are made by well known processes, such as a gel process (sodium silicate and alumina) or clay process (kaolin), which form a matrix to which the zeolite is added. Preferable synthetic zeolites include Linde® AW-30, Linde®AW-500, Linde®4-A and Zeolon®900.

It is envisioned that the systems and methods of the present invention can utilize either natural, synthetic or a mixture of natural and synthetic zeolite in the preparation of the chemically treated zeolite.

Chemically Treated Zeolites:

The zeolites used in the present invention include any zeolite having a capacity for loading ferric ions, and other similarly reactive metal ions, to a sufficient capacity for use in the removal of arsenic from an aqueous medium. The chemically treated zeolites of the present invention act both as molecular sieves and as affinity exchange medium for the removal of arsenic from an aqueous medium.

In general, the chemically treated zeolites of the present invention are prepared using the following process: the fines and clays are removed from the zeolite material, typically by decanting or using commercial scrubbing and sizing devices such as trommels, classifiers, and vibrating screens. To illustrate the remainder of the process a ferric-loaded zeolite is described, although other chemically treated zeolites are contemplated to be within the scope of the present invention. A ferric containing solution is added to the zeolite, for example ferric sulfate, to provide from about 0.5 to 4 meq of ferric iron per gram of zeolite. The ferric iron is allowed to contact/circulate over the zeolite for a pre-set amount of time or bed volumes. The pH of the reaction is controlled to minimize precipitation of the various iron containing materials, preferable pH conditions are from about 2.0 to 2.5, although a pH of slightly above or below this range is envisioned to be within the scope of the present invention.

Once the zeolite is loaded with ferric ions, the chemically treated zeolite is slowly rinsed and neutralized to remove the unbound ions and to raise the pH of the column to a range of from 4.0 to 5.5. The pH change must occur slowly with regard to the zeolite to avoid precipitation of the iron out of solution. A number of different hydroxides are useful in raising the pH, for example sodium hydroxide and calcium hydroxide.

The column can then be drained, dewatered, and low-temperature dried. Although ferric ions are preferable for loading onto the zeolites of the present invention, other like metallic ions can be substituted. The chemically treated zeolite materials for use in the present invention include: ferric-loaded zeolite, ferric hydroxide-loaded zeolite, aluminum-loaded zeolite, barium-loaded zeolite, zinc-loaded zeolite and copper-loaded zeolite. Further, it is recognized that each of the different chemically treated zeolites has a different affinity for various forms of arsenic. For example, the ferric-loaded zeolite is highly effective in absorbing arsenic in the form of arsenate, but less effective at absorbing arsenite, and, in contrast, aluminum-loaded zeolites are more effective at absorbing arsenic in the form of arsenite.

Table 1 illustrate examples for the preparation of ferric-loaded and aluminum loaded zeolite.

TABLE 1

Preparation Of Ferric-Loaded And Aluminum Loaded Zeolite

| Purpose: | Wash, screen, and metal-load zeolite for use in arsenic removal tests |
|---|---|
| Procedure: | Pulp 500 grams zeolite in hot water for 30 minutes. Settle, decant |
| | Repulp in hot water for 5 minutes |
| | Settle, decant |
| | Screen on 35 or 40 mesh screen to remove fines. |
| | Low-temperature (50° C.) oven dry |
| | When dry, rescreen on 35-40 mesh screen. |

Ferric form zeolite:

Take 200 grams of dry, sieved zeolite
Contact overnight with 37.6 grams Fe2(SO4)3.xH2O
404.0 meq Fe in 2000 ml water.
Sieved solutions to recover zeolite and rinse zeolite with water.

| Measure solution/wash volume | 2180 ml |
|---|---|
| Measure solution final pH | 2.05 |
| Submit for iron analysis | WRT-5-22-1 |
| Air dry zeolite | WRT-5-22-2 |

Aluminum form zeolite:

Take 200 grams of dry, sieved zeolite
Contact overnight with 44.4 grams Al2(SO4)3.18H2O
400.0 meq Al in 2000 ml water.
Sieved solutions to recover zeolite and rinse zeolite with water.

| Measure solution/wash volume | 2200 ml |
|---|---|
| Measure solution final pH | 2.30 |
| Submit for aluminum analysis | WRT-5-22-3 |
| Air dry zeolite | WRT-5-22-4 |
| | meq residual |

| Analyses | Al | Fe | Ca | Na | Al | Fe |
|---|---|---|---|---|---|---|
| FeZ | | 1755 | 125 | 905 | | 206 |
| AlZ | 1355 | | 26 | 595 | 331 | |

| Loading on zeolite, Meq/g | Fe | Al | Ca | Na |
|---|---|---|---|---|
| Iron | 0.99 | | 0.034 | 0.429 |
| Aluminum | | 0.34 | 0.014 | 0.285 |

In general, the chemically treated zeolites are preferably prepared by processes that keep more of the surface area of the zeolite material open for absorption. Processes, such as precipitation of the ions onto the zeolite, are less desirable for chemically treating zeolite as the precipitated ions may seal the zeolite pores, thereby decreasing the surface area to absorb arsenic. As such, pH values above the metallic ions precipitation value, during the production of chemically treated zeolites, are avoided.

Note that various combinations of chemically treated zeolites can be utilized in one or more housing members to maximize the capacity of the chemically treated zeolite for removal of all species of arsenic from the aqueous medium. For example, one housing member may be loaded with a mixture of ferric-loaded zeolite and aluminum-loaded zeolite, or an aqueous medium could be run through a first housing member charged with a ferric-loaded zeolite and then through a second housing member charged with a aluminum-loaded zeolite. The combinations of loaded-zeolites can be selected depending on the characteristics of the particular aqueous medium and the species of arsenic contained therein. The proportions of the various loaded-zeolites can also be varied accordingly. This provides broad latitude to custom design arsenic removal systems and methods for a variety of aqueous medium.

Arsenic Removal from Aqueous Medium Using Chemically Treated Zeolite

The present invention relates to systems and methods for extracting arsenic present in an aqueous medium at a first level to arsenic present in an aqueous medium at a second, third, etc, level. For purposes of the present invention, a "first level" of arsenic is preferably a concentration within an aqueous medium that exceeds the acceptable discharge limits, or Maximum Contaminant Levels (MCL), set by the Environmental Protection Agency (EPA) measured in parts per billion (ppb), i.e., 10 ppb. Note that for purposes of the present invention, MCL is envisioned to incorporate or corresponds to the regulatory arsenic limits set by other countries besides the United States, and EPA is envisioned to represent not only the regulatory authority of the United States, but to represent regulatory authorities in other countries besides the United States.

A "second level" of arsenic is a concentration within an aqueous medium lower than the "first level." Preferably the second level is a concentration within an aqueous medium lower than the MCL. A "third level" of arsenic is a concentration within an aqueous medium lower than the second level. Preferably, this third level is a concentration lower than the MCL. As such, the first level is higher than the second level, which is higher than the third level. It is also envisioned that additional levels exist below the third level, each of which has an incrementally smaller amount of arsenic in the aqueous medium and each of which is the result of contact with an additional amount of chemically treated zeolite.

The arsenic removal systems and methods of the present invention are designed to be incorporated into conventional water treatment systems, and preferably are designed to be incorporated into these systems as stand-alone units. Typically, the incorporation of the systems and methods of the present invention do not require that the existing system be re-designed, but rather, that the arsenic removal systems and methods be adapted to function before, during or after the more conventional water treatment. Preferably, embodiments of the arsenic removal systems and methods of the present invention are added to existing water treatment facilities as a first treatment step. Preferably, embodiments of the present invention remove an amount of arsenic from a water source to meet the MCL for arsenic in the United States, i.e., below 10 ppb.

The systems and methods of the present invention are adapted for use with existing water treatment plants as a "turn-key" or "bolt-on" process to remove arsenic from aqueous media. These facilities can be used to improve the quality of aqueous media in a number of applications, including drinking water, waste water, agricultural water and ground water. In the same manner, the systems and methods of the present invention can be incorporated into new water treatment plant designs, again as "turn-key" or "bolt-on" process to the conventional water treatment facility, or integrated into the facility as designed by one of skill in the art.

The reactions believed to take place in both the loading of the zeolite, for example with ferric ions, and the subsequent absorption of arsenic in the form of arsenate, from an aqueous medium are illustrated as follows:

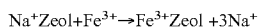

$Na^+Zeol + Fe^{3+} \rightarrow Fe^{3+}Zeol + 3Na^+$

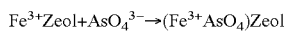

$Fe^{3+}Zeol + AsO_4^{3-} \rightarrow (Fe^{3+}AsO_4)Zeol$

Of particular interest in this case is the fact that the resulting spent zeolite $((Fe^{3+}AsO_4)Zeol)$ is insoluble. The insoluble spent zeolite passes the EPA's Toxicity Characteristic Leaching Procedure (TCLP), allowing the spent zeolites to be disposed of at arsenic approved landfills or other like waste disposal facilities.

Referring to FIG. 1, a flow diagram of a method 100 for the removal of arsenic from aqueous media is shown. In step 102, the level of arsenic is measured in the aqueous media feed to determine a first level of arsenic. In step 104, an optional determination can be made as to whether the feed has sufficient arsenic content to require removal of some or all of the arsenic from the aqueous media. In cases where the feed has an arsenic content below a target threshold of arsenic, the medium is passed directly to the conventional water treatment facility. In cases where the feed requires the removal of arsenic, the feed is directed to treatment as shown by step 106. In step 106, the aqueous media is placed in contact with a sufficient amount of chemically treated zeolite for a sufficient amount of time to remove an amount of arsenic so that the aqueous media has a second level of arsenic. This step can be repeated so that the aqueous medium having a second level of arsenic is contacted with a second amount of chemically treated zeolite to remove an amount of arsenic, thereby leaving the aqueous media with a third level of arsenic. In each case the third level of arsenic is lower than the second level of arsenic which is lower than the first level of arsenic.

In step 108, the treated aqueous media is discharged from the chemically treated zeolite and the level of arsenic is measured, this is the discharge level of arsenic in the aqueous media. In step 110, a potential period of time, number of bed volumes, or other measuring process is used to determine the capacity of the chemically treated zeolite under the conditions of the arsenic removal process. In step 112, a determination is made in light of step 110 as to whether the chemically treated zeolite is sufficiently laden with arsenic to require replacement of the spent zeolite with fresh chemically treated zeolite. The spent zeolite is disposed of at the appropriate licensed arsenic approved landfill. In preferred aspects of the methods of the present invention, the spent zeolite is replace before the arsenic capacity of the chemically treated zeolite is reached.

Figure 2:
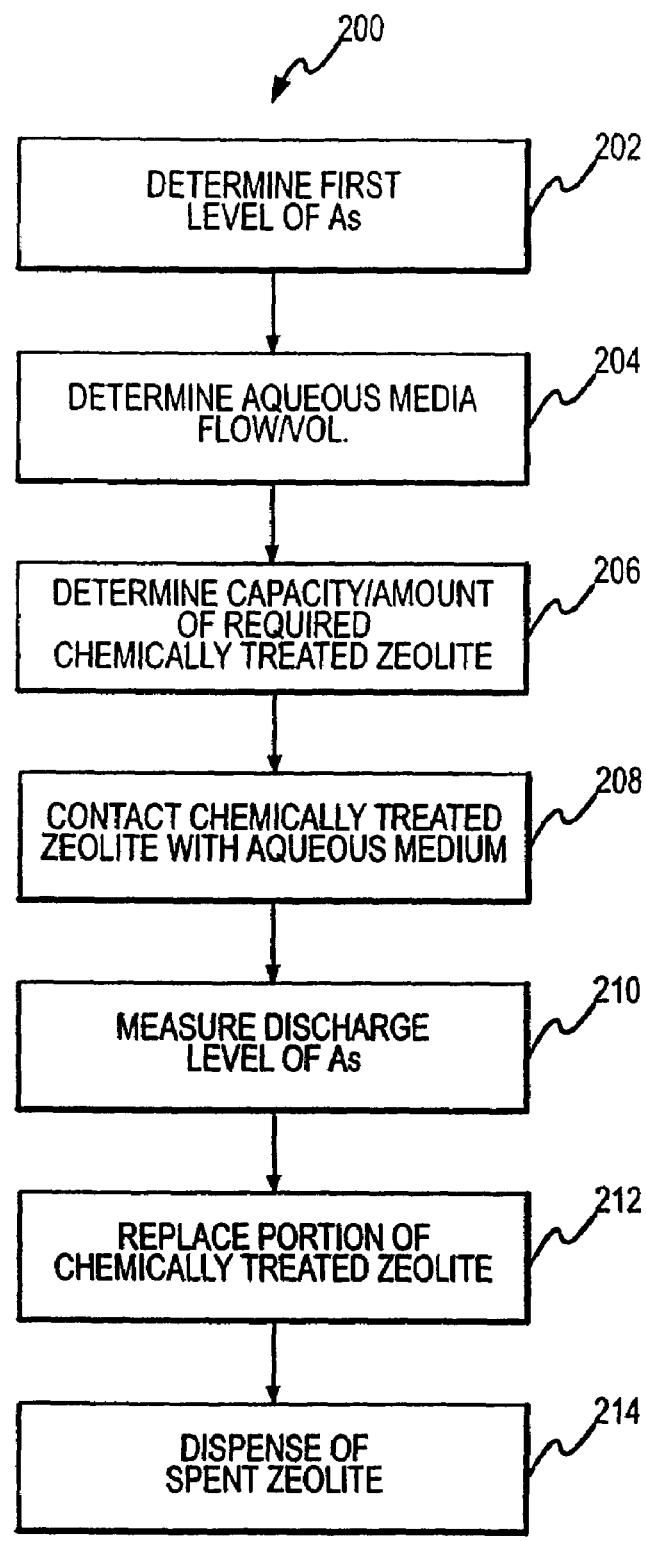
FIG. 2 illustrates a flow diagram of a method for removing arsenic from an aqueous media in accordance with another embodiment of the present invention.

Referring to FIG. 2, a flow diagram of another method 200 for the removal of arsenic from aqueous media is shown (note that steps 202, 204 and 206 are interchangeable in relation to each other). In step 202, the level of arsenic is measured in the aqueous media feed to determine a first level of arsenic. In steps 204 and 206, a determination is made as to the aqueous media flow and/or total volume of aqueous media to be treated by the chemically treated zeolite of the present invention, as well as a determination as to the amount and capacity of chemically treated zeolite required to treat the aqueous media to reach a pre-determined discharge level of arsenic. In preferred embodiments, the determination steps 204 and 206 are made so that the second or third or discharge level of arsenic is slightly below a threshold value, for example the MCL for arsenic in drinking water. Note that these steps include a determination of whether to bypass the chemically treated zeolite contact step (step 208) with a portion of the aqueous media at the first level of arsenic. This allows for a mixing of a portion of aqueous media at a first level of arsenic with treated aqueous media having an arsenic content at a second level, providing the discharge level of arsenic. In step 208, the determined flow of aqueous media is placed in contact with the determined amount of chemically treated zeolite for a sufficient amount of time, and within a pre-specified range of pH, to remove a pre-determined amount of arsenic, preferably so that the arsenic is present in the discharge at levels below a target threshold, for example the MCL for arsenic in the United States. In step 210, the discharge level of arsenic in the aqueous media is measured and is preferably compared to the first and second levels of arsenic in the aqueous media.

In step 212, a portion of the spent zeolite is bled away from the aqueous media and replaced with an equal amount of fresh chemically treated zeolite. In step 214, the spent zeolite is disposed of in an arsenic approved landfill. In some cases, where the spent zeolite has an appropriate capacity for arsenic remaining, the zeolite can be re-used in the treatment of aqueous media, and is added to the chemically treated zeolite in step 212, replacing fresh zeolite.

Figure 3:
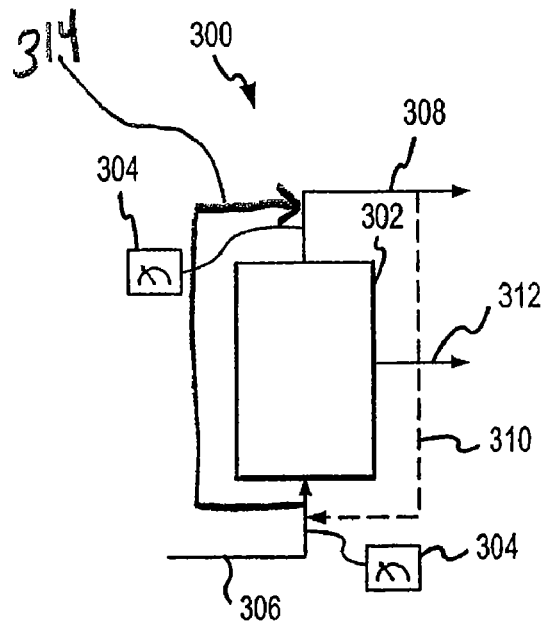
FIG. 3 illustrates a schematic for removing arsenic from an aqueous media in accordance with an embodiment of the present invention.

Referring to FIG. 3, a schematic showing a system 300 for removing arsenic from an aqueous medium is provided, the system having a housing member, i.e., an absorption column or tank 302, charged with a chemically treated zeolite. The housing member 302 containing the chemically treated zeolite can be operated as fixed or fluidized bed, or as a stirred reactor. The system also includes an arsenic monitoring device 304 to determine the arsenic levels at the feed 306 and a second arsenic monitoring device 304 for determining the arsenic levels at the discharge 308.

In use, the system 300 shown in FIG. 3 allows for the contact of the feed 306, having a first level of arsenic, with the chemically treated zeolite. The contacting step can be accomplished in a number of ways, including by a batch process, in which the aqueous medium is added to the column, agitated and removed, or in a continuous manner, where the aqueous medium is fed to the column inlet and allowed to pass through the column (up-flow or down-flow). Preferably, the aqueous medium is contacted with the chemically treated zeolite in an up-flow manner.

During the contact between the aqueous medium and the chemically treated zeolite, arsenic is absorbed to the chemically treated zeolite thereby decreasing the concentration of the arsenic in the discharged aqueous medium to a second level.

It should be noted that from an economic standpoint, it is desirable to remove only enough arsenic to keep the concentration of arsenic in the aqueous medium at the discharge just below a threshold level, for example the MCL for arsenic. The discharge level is preferably measured at a point in time when the aqueous medium is discharged from the system for further treatment by other processes. Adjustment of the discharge level of arsenic may be accomplished by adjusting the flow rate of the aqueous medium flowing through the tank, or the amount of chemically treated zeolite in the column to increase or decrease retention time. Additionally, an amount of aqueous medium containing arsenic at a first level may be diverted from passing through the housing member and blended with the aqueous medium exiting the housing member. This allows for an alternative method of adjusting the second level of arsenic in the aqueous medium. Further methods for adjusting the discharge level of arsenic involve the use of a continuous bleed of the chemically treated zeolite from the housing member, where an amount of chemically treated zeolite is replaced in the absorption column(s) on a regular basis. e.g., once a day, with fresh or partially loaded (with arsenic) chemically treated zeolite. Finally, the adjustment of the discharge level of arsenic can be accomplished by varying the amount of chemically treated zeolite present in the housing member(s). The amount of chemically treated zeolite used in the contact with the aqueous medium determines, in part, the capacity of the system. As such, the more chemically treated zeolite in the system, the greater will be the potential amount of arsenic that can be removed from the aqueous medium and conversely, the smaller the amount of chemically treated zeolite in the system, the smaller will be the potential amount of arsenic that can be removed from the aqueous medium.

With continued reference to FIG. 3, the aqueous medium can be re-circulated over the chemically treated zeolite in the housing member when the second level of arsenic is above a pre-determined threshold value (see dashed line 310). The aqueous medium can be re-circulated over the chemically treated zeolite, until the level of arsenic in the aqueous medium is appropriate for discharge from the system. In a further exemplary embodiment, a portion of the known volume of drinking water supply can by-pass 314 the chemically treated zeolite, and be combined with the drinking water supply discharged from the chemically treated zeolite.

Referring again to FIG. 3, once the chemically treated zeolite is spent, or nearly spent, it is removed from the housing member and disposed of in an approved landfill 312. For purposes of the present invention, zeolite is spent when it is no longer effective in absorbing arsenic from the aqueous medium to an adequate level. Preferably, spent zeolite is removed from the housing member by means of vacuum suction, or other like procedures.

A determination as to whether chemically treated zeolite is spent is monitored by selecting a particular threshold level of arsenic, for example the MCL for arsenic, and monitoring the level that exits the chemically treated zeolite. It is also noted, that monitoring of the level of arsenic loaded onto the chemically treated zeolite is accomplished by estimating the number of bed volumes required to achieve a desired reduction in concentration of arsenic from the aqueous medium and measuring the flow of the aqueous medium through the chemically treated zeolite. The estimation is based on an analysis of the particular aqueous medium composition, the chemically treated zeolite absorption properties, the desired reduction of arsenic concentration in the discharge, the anticipated flow rate, the housing member size and the water treatment facility capacity.

Again with regard to FIG. 3, for example, the aqueous medium would be monitored until a second level of arsenic exits the housing member, or by monitoring the flow rate through the housing member. Once the second level of the aqueous medium exceeds the MCL, or the anticipated number of bed volumes is reached, breakthrough occurs.

Figure 4A:
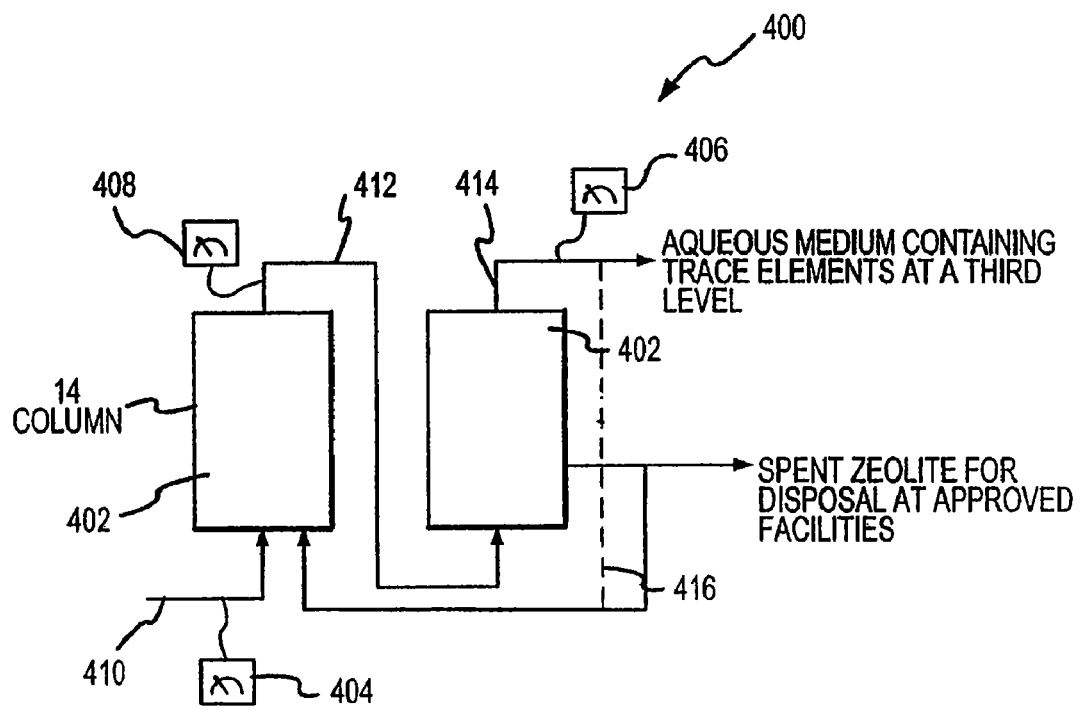
FIGS. 4A and B illustrate schematic for removing arsenic from an aqueous media in accordance with another embodiment of the present invention.
Figure 4B:
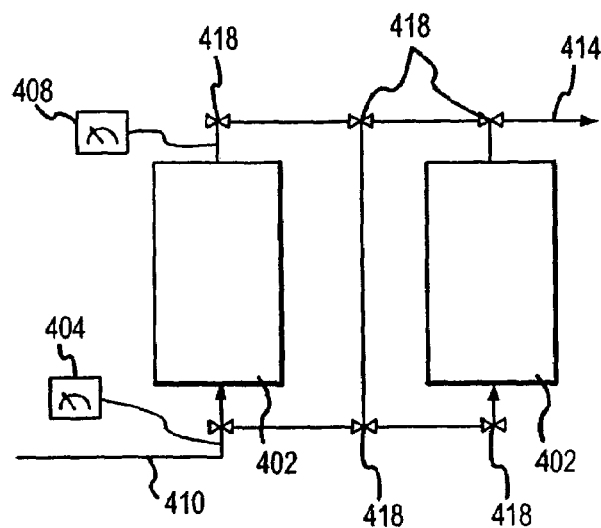
Figure 5:
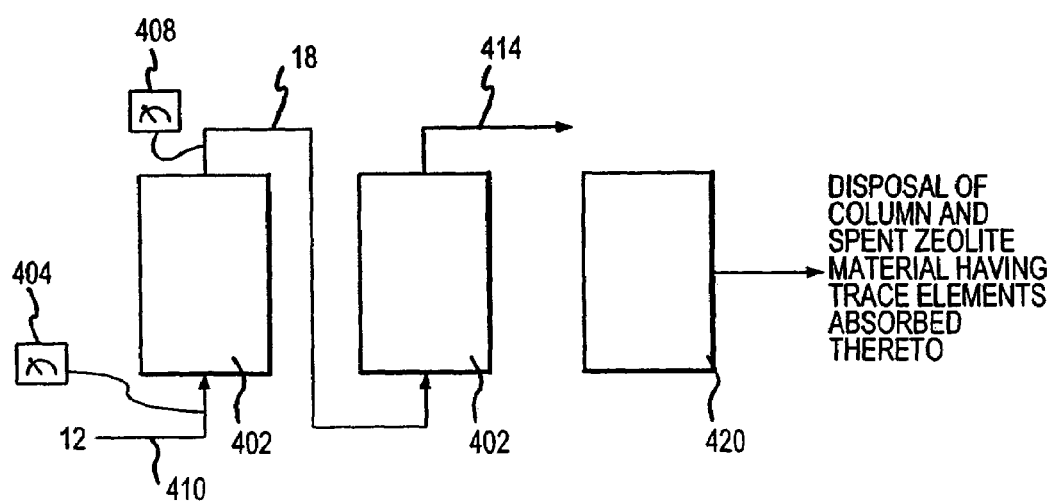
FIG. 5 illustrates a schematic for removing arsenic from an aqueous media in accordance with another embodiment of the present invention.

Another embodiment of the present invention is shown in FIGS. 4 and 5. In FIG. 4A, a schematic showing system 400 having a pair of housing members 402, for example columns, having appropriate amounts of chemically treated zeolite, are placed in series for the removal of arsenic from an aqueous medium. The system 400 further includes a first arsenic monitoring device 404 for determining the first level of arsenic, and a second arsenic monitoring device 406 for determining the third level of arsenic or discharge level of arsenic. An additional arsenic monitoring device 408 can be included for determining the second level of arsenic, or the level of arsenic in the aqueous medium before it enters the second housing member, if needed.

In use, the aqueous medium having a first level of arsenic 410 enters the first housing member and contacts the first amount of chemically treated zeolite. The aqueous medium exits the first housing member having a second level of arsenic 412. The aqueous medium having a second level of arsenic enters the second housing member and contacts the second amount of chemically treated zeolite. The aqueous medium exits the second housing member having a third level of arsenic 414. In this embodiment, the third level of arsenic is also the discharge level of arsenic. It is envisioned that additional columns can be added to the system where necessary. Also note that the aqueous medium can be re-circulated over the first or second amount of chemically treated zeolite to achieve an additional decrease in the level of arsenic in the aqueous medium (see above) (dashed line 416).

Once the chemically treated zeolite in the first housing member is spent, the chemically treated zeolite is removed and fresh chemically treated zeolite added. This can be accomplished by physically replacing the first housing member with a new housing member, where the new housing member is charged with a predetermined amount of chemically treated zeolite. The second housing member is moved in series to receive the first level of arsenic and the new housing member is placed in series to receive the aqueous medium containing the second level of arsenic (see FIG. 5). In this way the chemically treated zeolite is systematically moved from the second housing member in the series to the first member in the series to removal from or out of the series 420. In an alternative embodiment, the chemically treated zeolite is replaced without replacing the housing member itself. Here the flow of the aqueous medium having a first level of arsenic is switched to entirely go through the appropriate housing member while the other housing member has its spent chemically treated zeolite replaced with new chemically treated zeolite (see FIG. 4B). Also note, as shown in FIG. 4B, the design of the flow through the housing members may be altered to run in parallel. In this embodiment, once the chemically treated zeolite is spent, the flow is diverted to re-circulate through one of the two housing members, and the other housing member's spent material replaced with fresh chemically treated zeolite. Once completed the flow is diverted to the newly charged housing member and the chemically treated zeolite in other housing member can be replace if appropriate. The flow of aqueous medium, as shown in FIG. 4B, can be appropriately directed in the system by a series of valves 418, or other like devices.

It is envisioned that embodiments of the present invention could include additional housing members charged with chemically treated zeolite depending on the needs of the system, and any number of different combinations of in-series and in-parallel or mixtures of in-series and in-parallel designs are within the scope of the present invention.

In general, one million gallons a day of water can be treated through two 12×12 columns, each containing 8 to 9 feet of zeolite (see examples below).

The embodiments of the present invention provide for the disposal of spent chemically treated zeolite without the need to shut down the water treatment facility, and provides redundancy for the system should any one of the housing members fail for reasons such as bio-fouling, short-circuiting, leakage, or other potential mechanical difficulties.

Systems for Monitoring and Disposing of Arsenic from an Aqueous Medium

The present invention contemplates a system for operating the equipment required to remove arsenic from a target water source by an off-site provider, for example a company that specifically installs, monitors, trouble-shoots, and disposes of the zeolite materials in the tanks/columns of the present invention. The off-site provider is contemplated to be hired by a municipality or other like agency or group to maintain the arsenic levels in the municipalities water via the systems and methods of the present invention. The off-site provider is responsible for determining the arsenic removal requirements of the target water source, for example a water treatment facility, including the type and amount of chemically treated zeolite required, the number of tanks necessary to house the chemically treated zeolite, the design of the flow through the tanks, i.e., up-flow, down-flow or batch, and in-series or in-parallel, the flow rate of the aqueous medium, the length of time or bed volumes before disposal, and the spent zeolite disposal site. Note that other parameters may be involved in the operation of the arsenic removal system that could be handled by the off-site provided, such that the above list is meant for illustrative purposes. The off-site provider provides the benefit of maintenance free use of the arsenic removal technology to the water treatment facility manager without having the burden of maintaining, monitoring, replacing, refreshing, or disposing of the loaded zeolite material(s). This system provides a financial benefit to the municipality or other water rights holder, in that it allows the municipality to hire an arsenic removal specialist to efficiently remove and dispose of arsenic to levels that comply with the EPA.

The off-site provider installs the properly charged chemically treated zeolite materials at the water treatment facility and monitors the first level, second level, discharge level, etc of the arsenic in the water. The arsenic monitoring can be technician based, i.e., a technician goes to the installed system and takes samples from the feed and discharge for arsenic testing, or can be performed by a pre-programmed flow reading system that transmits, via wireless communication for example, the number of bed volumes or time elapsed that the system has been in use, and whether the estimated capacity of the chemically treated zeolite has been attained, to a off-site computer of other like instrument (the data can also be tabulated or graphed to establish trends and other useful information). The off-site monitoring unit can be equipped with a signaling means for alerting the off-site provider of over target times or bed volumes, or can be equipped to read sensors in the housing members or connection lines between housing members that alert the off-site provider of potential problems in flow-rate, pressure, etc. In one embodiment, the off-site provider has the capability of diverting the water supply from one source of chemically treated zeolite to a second source of chemically treated zeolite, when the provider receives a signal that the first source of chemically treated zeolite has contacted a pre-set threshold amount of aqueous medium or been in use for a pre-set amount of time. Preferably, the diversion can be accomplished from an off-location site via wireless signal transmission.

The off-site provider is responsible for coordinating any maintenance or trouble-shooting issues that arise during the arsenic removal process. As such, alarms or other signaling devices may be included in the zeolite housing members to alert the provider of a potential malfunction in the system. Further, the off-site provider is responsible for the replacement and disposal of used or spent chemically treated zeolite, and in particular is responsible for the disposal of the spent chemically treated zeolite at approved arsenic disposal landfills.

This system if made possible by the simplicity of implementation, operation, monitoring, and servicing of the present invention. As described previously, the above-systems operate with housing members, for example columns charged with appropriate materials, which are easily built, maintained, and serviced. Several columns can be used in-parallel, or in-series, and any one of the columns can be replaced or shifted as desired, all with minimal interruption of the removal of arsenic from the process flow. These processes, as noted above, can be performed in an automated fashion from an off-site location. Thus, the technology could include a service structure wherein a column, a plurality of columns in parallel, a series of columns, or any combination thereof, is serviced (replaced or refreshed) by a separate entity than that which owns or operates the water treatment facility. In another embodiment the off-site provider simply manages the oversight of the arsenic removal and disposal system, either through its own know-how or by hiring and maintaining specialized service personnel or independent contractors.

Regeneration of Chemically Treated Zeolite

In an alternative embodiment of the present invention, compositions, systems and methods are provided for the regeneration of spent or partially spent chemically treated zeolite. As discussed above, embodiments of the chemically treated zeolite are used to absorb target analytes, e.g., arsenic, uranium, chromium, or other like materials, from an aqueous medium, for example a drinking water supply. Note that this embodiment is described in more detail in relation to arsenic removal from an aqueous medium, but could also be applied to chemically treated zeolite used to remove uranium, chromium or other like material from an aqueous medium. As such, the scope of the present embodiment is directed to the regeneration of chemically treated zeolite used in the removal or absorption of arsenic, uranium, chromium or any other like material, so as to improve the treated zeolite's capacity, to improve the level of analyte bound to the treated zeolite, and to minimize the amount of treated zeolite disposed of at a regulated disposal site for any particular amount of analyte removed from an aqueous medium.

The capacity of the chemically treated zeolite for absorbing arsenic is at least partially determined by the number of free arsenic binding sites, i.e., analyte binding sites, on the treated zeolite (for example, the amount of ferric ion available on the zeolite to pass the arsenic over—see previous sections). During use, the number of available arsenic binding sites will become blocked or occupied with either arsenic, or other like charged, or like affinity, "contaminant," i.e., other non-arsenic like materials, e.g., silicate, carbonate, etc which are present in the aqueous medium. Once the zeolite has reached the point where the majority of its binding sites are blocked by arsenic and contaminants, it is referred to as spent—it will have very low capacity for continued removal or arsenic from the feed aqueous media.

Previous embodiments of this invention focused on removal and replacement of spent zeolite with freshly prepared chemically treated zeolite. However, in the present embodiment, the spent chemically treated zeolite is regenerated to selectively remove contaminant ions from the zeolite arsinic binding sites. The contaminate removal is selective, where a majority of the arsenic remains on the arsenic binding sites while other contaminates are removed from these same types of sites, i.e., due to the weaker interactions of the contaminates with the arsenic binding sites as compared to arsenic, which has an optimal charge and size for removal by the chemically treated zeolilte. As such, additional arsenic binding sites on the chemically treated zeolite become available, after the regeneration process, without the loss of the already absorbed arsenic. The capacity of the chemically treated zeolite material is therefore being increased selectively for the target—arsenic. Note that a certain small fraction of contaminates will have a similar size and charge as the arsenic and will also remain bound to the chemically treated zeolite during the regeneration wash, however, the vast majority of sites will become unoccupied thereby increasing the overall capacity of the chemically treated zeolite for further contact with an aqueous medium.

Contaminant binding to arsenic binding sites of the chemically treated zeolite is often the result of ionic, affinity or other like interactions between the contaminant and the arsenic binding site, for example iron(III) interactions with silicate. In one embodiment of the invention, the spent zeolite is contacted with an acid wash to predominately release contaminant materials from the arsenic binding sites, while having little or no effect on the arsenic bound to the same sites. As such, arsenic can be absorbed to the chemically treated zeolite until the capacity of the material to remove arsenic is minimized. The material is then treated with an acid wash to selectively or predominately remove contaminant binding from the arsenic binding sites, thereby regenerating the arsenic removal capacity of the material. Additional arsenic can then be passed over the regenerated column to again remove additional arsenic from the aqueous medium. In a preferred embodiment, a series of regeneration steps is utilized to selectively increase the capacity of the chemically treated zeolite for arsenic, by selectively cycling arsenic onto the zeolite while removing contaminant from the zeolite. In this manner the capacity of the chemically treated zeolite is optimized with respect to arsenic, and also allows for an efficient use of the resources necessary for the disposal of arsenic laden chemically treated zeolite at a regulated landfill/disposal site.

In preferred embodiments, the acid or regenerating wash of the spent zeolite is performed using an acidic material. Example acid wash materials include, but are not limited to, hydrochloric acid, nitric acid, sulfuric acid and the like. Concentration of the acid is dependent on the pH of the acid wash, being at least below 3.5, and preferably below at least 3.1. In one embodiment, the acid wash is performed using an acid wash having a pH of about 3.0. One preferred acid wash material is sulfuric acid having a pH of between 2.0 and 3.5. Note also that if the pH of the acid wash solution becomes to low, i.e. below 2.0, it is possible that the acid wash will remove both arsenic and contaminant equally.

As noted previously, the regenerating solution or acid wash can be performed whenever the capacity of the chemically treated zeolite becomes limited. This point does not always correspond to the chemically treated zeolite being spent. Acid wash can be contacted or applied to the zeolite when 25%, 50%, or other like % of arsenic binding sites have become occupied or blocked with arsenic and contaminant. This process can be repeated until a sufficient amount of arsenic is loaded onto the chemically treated zeolite. Typically, the pH of the aqueous media feed is from 7 to 8 thereby effectively neutralizing the chemically treated zeolite after the acid wash has been completed.

In one embodiment, the acid wash is collected after contact with the chemically treated zeolite and regeneration of the chemically treated zeolite for disposal in a diluted form with the discharge, or after neutralization using a base material. In another embodiment, the contaminant containing acid wash is fed back into the feed water for recirculation over the chemically treated zeolite.

Figure 10:
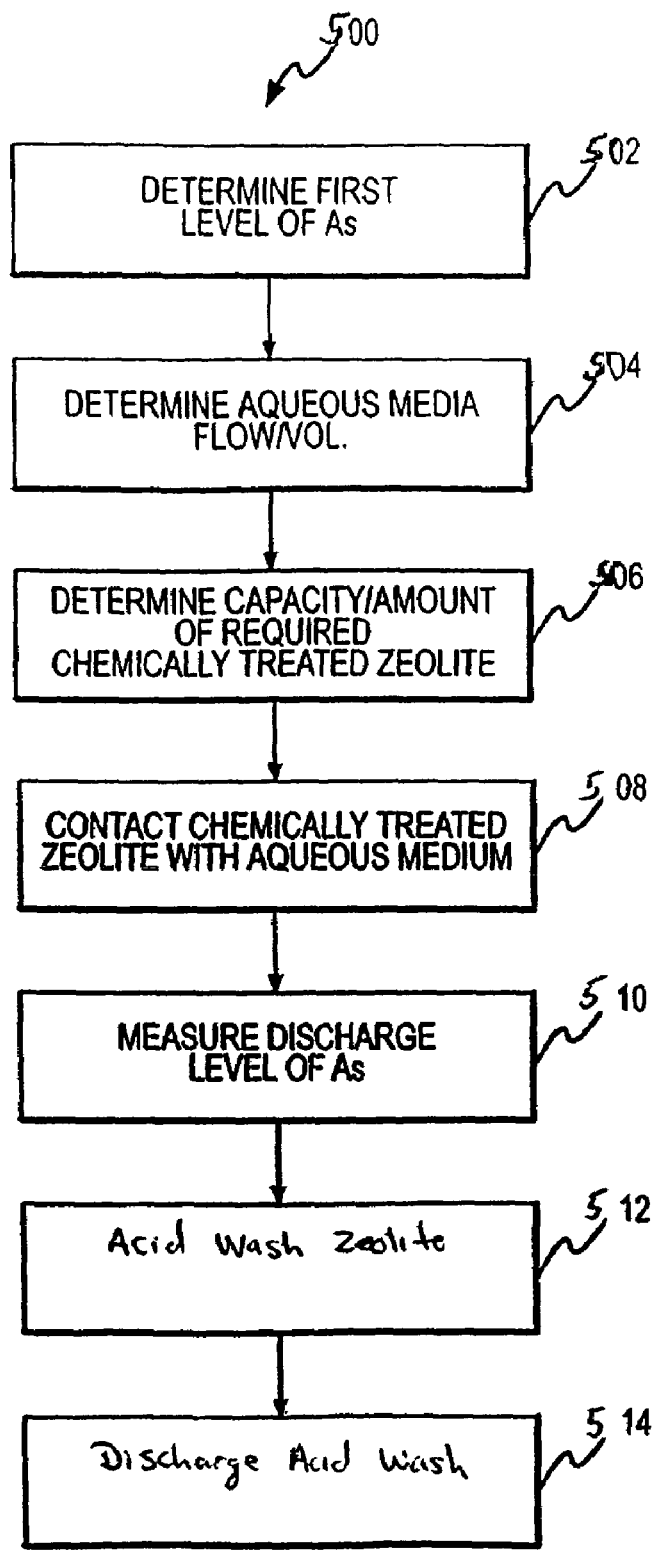
FIG. 10 illustrates a flow diagram of a method for removing arsenic from an aqueous media in accordance with another embodiment of the present invention where the chemically treated zeolite is regenerated to facilitate the capacity of the material for arsenic.

Referring to FIG. 10, a flow diagram of another method 500 for the removal of arsenic from aqueous media is shown (note that steps 502, 504 and 506 are interchangeable in relation to each other), including the step of chemically treated zeolite regeneration. In step 502, the level of arsenic is measured in the aqueous media feed to determine a first level of arsenic. In steps 504 and 506, a determination is made as to the aqueous media flow and/or total volume of aqueous media to be treated by the chemically treated zeolite of the present invention, as well as a determination as to the amount and capacity of chemically treated zeolite required to treat the aqueous media to reach a predetermined discharge level of arsenic. In preferred embodiments, the determination steps 504 and 506 are made so that the second or third or discharge level of arsenic is slightly below a threshold value, for example the MCL for arsenic in drinking water. Note that these steps include a determination of whether to bypass the chemically treated zeolite contact step (step 508) with a portion of the aqueous media at the first level of arsenic. This allows for a mixing of a portion of aqueous media at a first level of arsenic with treated aqueous media having an arsenic content at a second level, providing the discharge level of arsenic. In step 508, the determined flow of aqueous media is placed in contact with the determined amount of chemically treated zeolite for a sufficient amount of time, and within a pre-specified range of pH, to remove a predetermined amount of arsenic, preferably so that the arsenic is present in the discharge at levels below a target threshold, for example the MCL for arsenic in the United States. In step 510, the discharge level of arsenic in the aqueous media is measured and is preferably compared to the first and second levels of arsenic in the aqueous media.

In step 512, an acid wash having a pH of between about 2.0 and 3.5, and preferably about 3, is contacted to the arsenic loaded chemically treated zeolite. In step 514, the acid wash is discharged from the now regenerated chemically treated zeolite and returned to the feed, leaving most of the absorbed arsenic on the column but increasing the capacity of the column for absorbing additional arsenic from the aqueous medium. Due to the strong interaction between arsenic and Fe(III), for example, the acidic wash has a much greater effect on interrupting the interaction between the contaminates and Fe(III). Once the interaction between the contaminates and Fe(III) is interrupted, the contaminates will begin to be released into the aqueous medium for discharge from the chemically treated zeolite. In some cases, additional unused chemically treated zeolite can be added to the regenerated chemically treated zeolite to increase the capacity of the material. Additional steps include contacting the acid wash to the chemically treated zeolite for additional periods of time to optimize the capacity of the regenerated chemically treated zeolite.

Note that this embodiment is not meant to remove all contaminates from a chemically treated zeolite, nor will all of the target analyte remain on the chemically treated zeolite in the presence of the regenerating wash, however, the wash selectively removes a greater proportion of weaker binding/interacting contaminates from the chemically treated zeolite as compared to the target analyte, e.g., arsenic, uranium, chromium, etc. In this manner, the chemically treated zeolite is regenerated for maximum capacity for the target analyte, thereby providing a significant cost improvement over having to replace all of a spent chemically treated zeolite with new chemically treated zeolite. In addition, by maximizing the capacity of chemically treated zeolite for the target analyte, the cost of disposal of the spent and regenerated chemically treated zeolite is maximized (numerous types of target analytes must be disposed of at regulated disposal sites).

Having generally described the invention, the same will be more readily understood by reference to the following examples, which are provided by way of illustration and are not intended as limiting.

EXAMPLES

Note that the arsenic assay procedures used throughout the Examples section were performed by the Commercial Testing & Engineering lab (CT&E) at 4665 Paris St., Denver, Colo. Analysis were performed using graphite furnace atomic absorption (GFAA) according to EPA protocol number 7000. Iron, calcium, sodium, etc concentrations were all determine using standard atomic absorption techniques known in the art. These procedures were in accordance with EPA protocol number 6010.

Also note that the chemically treated zeolites shown in the Examples below were generally prepared according to the following protocol:

For laboratory scale experiments 500 grams of zeolite are placed in a four to eight liter container, and the container filled with water and stirred with a mechanical mixer for approximately thirty minutes. The zeolite was allowed to settle and the water (generally containing suspended clays and fines) decanted. Water was added to the settled solids, remixed, and decanted an additional one or two times. The settled solids are dried at low temperature (35° to 50° C.) and sieved on a 35- or 40-mesh screen to remove any remaining fines. On a larger scale, the clays and fines are removed from the zeolite using commercial scrubbing, and sizing devices such as trommels, classifiers, and vibrating screens.

To absorb the appropriate metal ion onto the zeolite, for laboratory scale experiments, 400 grams of dry, sieved zeolite are placed in a one gallon bottle with one hundred and fifty grams of commercial ferric sulfate and 3,500 ml water. The 150 grams ferric sulfate makes available approximately 2 milliequivalents (meq) ferric iron per gram of zeolite. A milliequivalent is defined as the amount of any element that will displace one milligram of hydrogen. It is in effect, a mass measurement adjusted for the electrical charge of the particular element.

The one gallon bottle is sealed and agitated on a roller apparatus for up to sixteen hours. Contact can also be accomplished using a one-gallon container and a mechanical stirrer, or other like technique. Once the ferric iron is loaded onto the zeolite, the ferric-loaded zeolite can be dewatered and any generated fines removed on a 35- or 40-mesh sieve. The dewatered zeolite is low-temperature dried, i.e., room temperature to 50° C. Note that on a larger scale, a column is loaded with the sieved zeolite and ferric sulfate solution circulated through the column for a pre-set number of bed volumes/time. After the zeolite is loaded with the ferric ions, the solution is drained from the column, the zeolite neutralized and rinsed, removed from the column and, if desired, low temperature dried. Other metal ions or mixtures of metal ions can be absorbed onto the zeolite by providing in the contact solution approximately 2 meq of metal ion per gram zeolite.

Note also that the pH of the metal ion-zeolite contact is preferably maintained between 2.0 and 2.5, requiring that the neutralization and rinse steps bring the pH up to approximately 4 to 5.5. This is typically done in a slow and controlled manner with the addition of NaOH or CaOH or other like base material.

Example 1

Preparation of Ferric-Loaded Zeolite

Figure 6:
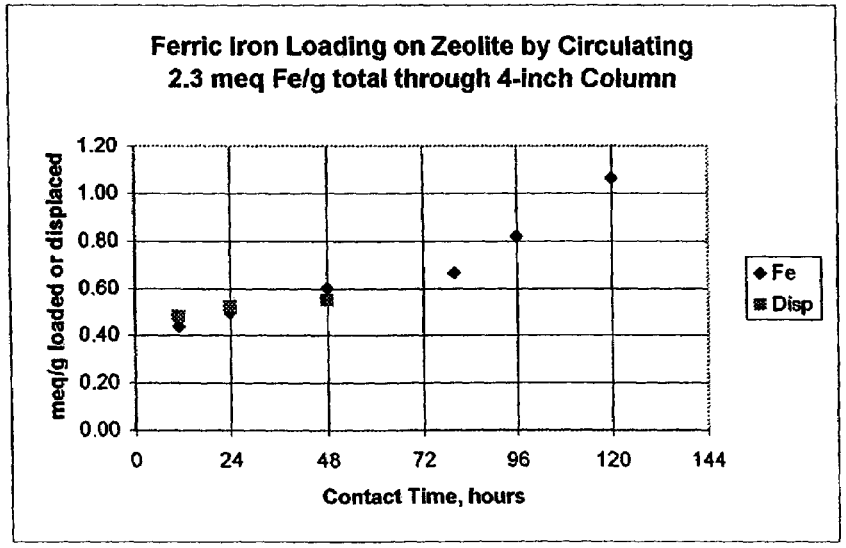
FIG. 6 is a tabular and graphical representation of ferric iron loading on zeolite in accordance with an embodiment of the present invention.

The data shown in FIG. 6, illustrates one embodiment for preparing a chemically treated zeolite in accordance with the present invention. Three thousand pounds of ferric form zeolite was prepared by charging two, 24 inch diameter columns each with 1500 pounds of 8×40 mesh zeolite. Two hundred fifty pounds commercial ferric sulfate (0.9 meq/g zeolite) was dissolved in 4700 pounds water (560 gallons) and circulated up-flow through the columns for 48 hours. After 48 hours, the solution containing 3.5 g/L iron at 2.25 pH was drained from the columns and discarded. Approximately 0.6 meq Fe/gram was loaded onto the zeolite.

A second volume of solution was prepared by dissolving 390 pounds commercial ferric sulfate (1.4 meq Fe/g zeolite) in 4700 pounds water. This solution was circulated through the columns for approximately 48 hours. The solution pH of 1.8 was raised to 2.1 by the addition of sodium hydroxide. After 48 hours the solution containing 1.1 g/L iron at 2.06 pH was drained from the columns and discarded. An additional 0.5 meq Fe/g was loaded on the zeolite (total loading of 1.1 meq Fe/g).

The column was then rinsed with water to remove the residual, soluble iron. A final volume of water was circulated through the columns. Sodium hydroxide was slowly added to the circulating solution until the pH was greater than 4.

The neutralization solution was drained from the column and the zeolite removed. The present Example illustrates the utility of the present invention for preparing a ferric-loaded zeolite for use in removing arsenic from an aqueous medium.

Example 2

Ferric-Loaded Zeolite Removes Arsenic with High Capacity

Figure 7C:
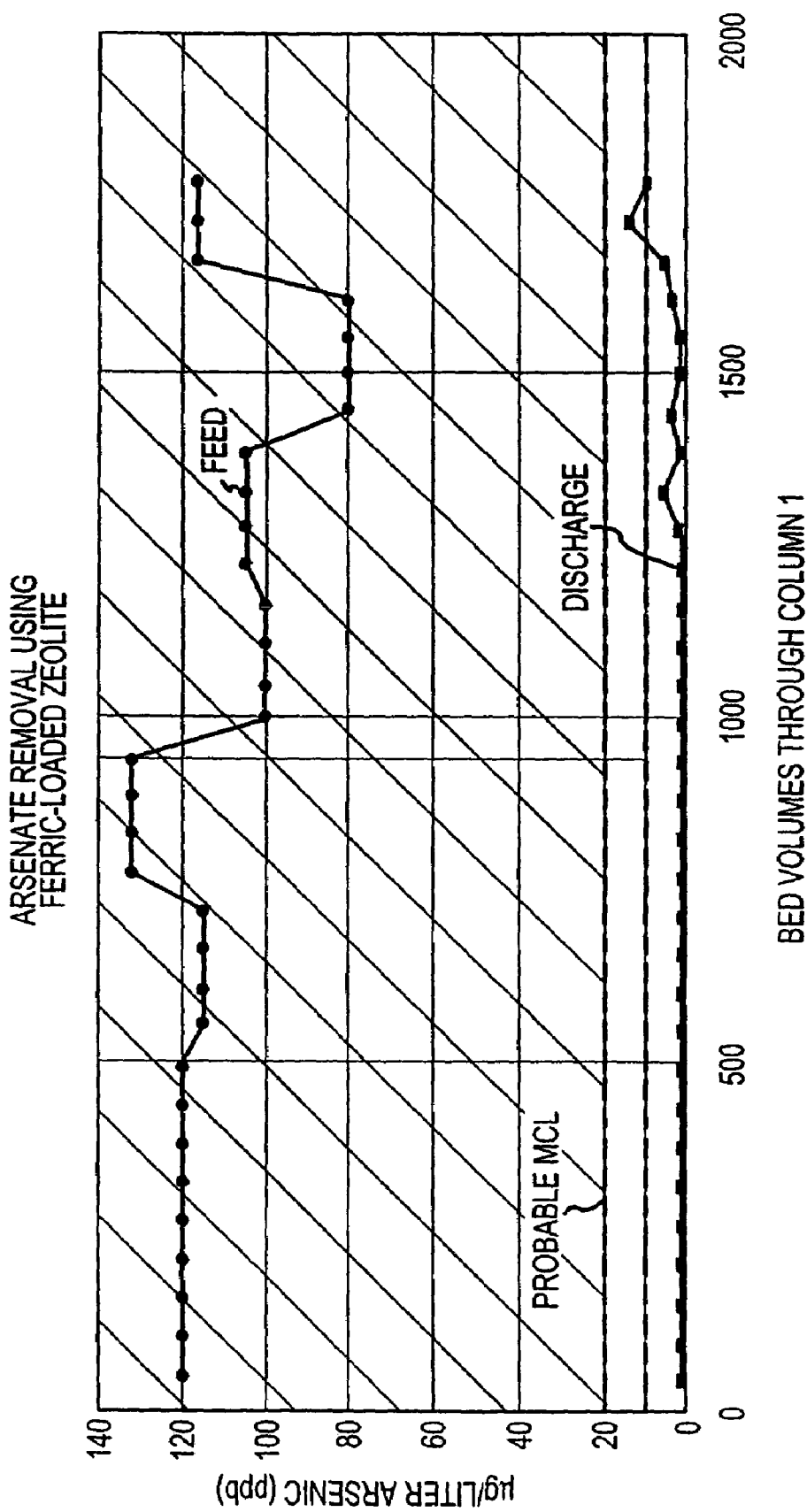

The data shown in FIGS. 7A-7C, were obtained by running the following fixed column test (continuous flow configuration):

A series of two, 250 ml burets, were set-up in series, where each buret contained approximately 200 ml of ferric-loaded zeolite. Note that a small wad of glass wool was inserted into the bottom of each buret prior to the addition of the ferric-loaded zeolite. A solution reservoir was connected to the bottom of the first buret using a Masterflex pump.

A solution containing 10 gallons of tap water, 0.16 grams sodium arsenate (dibasic, heptahydrate), and 7.4 grams calcium chloride was prepared. The solution was pumped slowly up-flow through the ferric-loaded zeolite and collected at discharge for analysis. Discharge was analyzed for arsenic levels.

The data illustrated in FIG. 7, show that ferric-loaded zeolites are extremely effective in removing arsenic from aqueous medium. FIG. 7C represents the performance of the first "column"—note that the two columns used in the Example are in series. Again with regard to FIG. 7, the concentration of arsenic (in the form of arsenate) in an aqueous medium containing approximately 120 micrograms of arsenic per liter of aqueous medium (equivalent to 120 ppb) is effectively reduced to less than 10 ppb for about 1715 bed volumes. In other words, breakthrough did not occur for more than 1715 bed volumes.

Example 3

Other Metal Ions Load Effectively onto Zeolite

Preparation of loaded-zeolite materials was as described previously (above), except, that 50 grams of zeolite was contacted overnight in a beaker having water solutions as shown in Table 2. Each solution was mechanically stirred for a period of from 1 to 16 hours.

TABLE 2

Arsenic Absorption Using Barium, Aluminum, Calcium, Ferric And Ferrous-Loaded Zeolites

| Purpose: | Evaluate Ba, Al, Ca, Fe++, and Fe+++ forms of zeolite for arsenic removal from water | | |
|---|---|---|---|
| Procedure: | Contact 50 gram portions of zeolite overnight in water solutions of the above to convert them to the respective forms. Add 2 meq/gram | | |
| 1 | Use | 12.2 grams BaCl2.2H2O | in 500 ml water |
| 2 | Use | 11.1 grams Al2(SO4)3.18H2O | in 500 ml water |
| 3 | Use | 11.8 grams CaNO3.4H2O | in 500 ml water |
| 4 | Use | 13.9 grams FeSO4.7H2O | in 500 ml water |
| 5 | Use | 9.4 grams Fe2(SO4)3.xH2O | in 500 ml water |
| | Sieve solutions to recover zeolite and rinse zeolite with water. Discard solutions. | | |
| | Contact each zeolite aliquot overnight with 3 liters demineralized water containing | | |
| | 100 ppb arsenic as sodium arsenate | | |
| | 6.7 milligrams Na2HasO4.7H2O in 16 liters water | | |
| | Take 1 liter water as head sample - 5-7-0 | | |
| | Sieve solutions to recover zeolite. | | |
| | Submit solutions for arsenic. | | Loaded onto Zeolite |

| | | As, µg/l | Removal, % | meq/g | g/kg |
|---|---|---|---|---|---|
| Label: | 5-7-0 | 95 | | | |
| | 5-7-1 | 85 | 11% | 0.00004 | 0.0006 |
| | 5-7-2 | 5 | 95% | 0.00036 | 0.0054 |
| | 5-7-3 | 86 | 9% | 0.00004 | 0.0005 |
| | 5-7-4 | 25 | 74% | 0.00028 | 0.0042 |
| | 5-7-5 | <5 | >95% | 0.00036 | 0.0054 |

Note:
Calculation assumes 75/5 as equivalent weight of arsenic

The data in Table 2 shows that a solution containing 100 ppb of arsenic as sodium arsenate, contacted with various chemically treated zeolites (including barium-loaded zeolite, aluminum-loaded zeolite, and ferric-loaded zeolite) resulted in the removal of an amount of arsenic from solution. For example, the barium-loaded zeolite removed approximately 11% of the arsenic, the aluminum-loaded zeolite removed approximately 95% of the arsenic and the ferric-loaded zeolite removed greater than 95% of the arsenic.

Example 4

Ferric-Loaded Zeolite is Effective at Removing Arsenite from Aqueous Medium

Five grams of ferric-loaded zeolite (prepared as described above) was contacted with 300 ml of demineralized water containing 300 ppb arsenic as sodium arsenite. Table 3 shows that approximately 75% of the arsenic in the form of arsenite is removed from the starting material.

TABLE 3

Removal Of Arsenic Using Ferric-Loaded Zeolites

| Purpose: | Evaluate Fe+++ forms of zeolite for arsenite removal from water. | |
|---|---|---|
| Procedure: | Contact 5 grams zeolite overnight with 300 milliliters demineralized water containing 300 ppb arsenic as sodium arsenite | |
| | 0.3 milligrams NaAsO2 in 500 milliliters water | As, ppb |
| | Take 200 ml balance as head sample - 6-5-0 | 538 |
| | Submit final filtrate as 6-5-1 | 134 |
| | Loaded on to zeolite    meq As(3)/g | 0.0006 |
| | g/kg | 0.016 |
| | Removal | 75% |

Note:
Calculation assumes 75/3 as equivalent weight of arsenic

The example illustrates the utility of using the present invention for removing arsenite from an aqueous medium.

Example 5

Ferric Hydroxide-Loaded Zeolite is Effective at Removing Arsenate from Aqueous Medium The ferric-hydroxide-loaded zeolite was prepared as described previously. A 250-ml buret was charged with 200 ml of the ferric hydroxide loaded-zeolite for this particular Example (A second head to Masterflex pump to Column C was used to obtain the data in FIG. 8).

The tabular data in FIG. 8A and 8B shows that ferric hydroxide-loaded zeolite is effective in removing arsenic in the form of arsenate to levels below 20 ppb, having a capacity of approximately 1,300 bed volumes (note, using a continuous flow configuration). The Example illustrates the utility of using ferric hydroxide-loaded zeolite for the removal of arsenate from an aqueous medium.

Example 6

Activated Alumina-Loaded Zeolite is Effective at Removing Arsenate from Aqueous Medium A standard test solution of arsenic was prepared by combining one liter tap water with 1.575 grams sodium arsenate and 0.7 grams calcium chloride (the solution contained 385 mg arsenic/L). A ferric-loaded and activated alumina-loaded zeolite column was prepared as previously described. Note that the calcium chloride was added to simulate potentially high levels of calcium found in drinking water.

One hundred ml of the arsenic solution was contacted with varying amounts of either ferric-loaded zeolite or activated alumina-loaded zeolite in a flask for a period of 12 hours. As shown in Table 4, the ferric-loaded zeolite absorbed 6 grams of arsenic/kg, while the activated-alumina-loaded zeolite absorbed over 36.5 grams of arsenic/kg. This Example again shows the utility of the present invention for providing a high capacity arsenic removal system, the system can utilize several different loaded zeolites.

TABLE 4

Test To Determine Maximum Loading Of Arsenic On Ferric-Loaded Zeolite And Activated Alumina

| Purpose: | To determine maximum arsenic loading onto zeolite | | | |
|---|---|---|---|---|
| Procedure: | Prepare 1 liter of arsenic solution | | | |
| | Make up water for treatment. Pe 1 Liter | | | |
| | 1.575   grams sodium arsenate (dibasic, heptahydrate) | | | |
| | 0.7      grams calcium chloride (anhydrous) | | | |

| | | | Loaded, Arsenic | |
|---|---|---|---|---|
| | | As, mg/l | meq/g | g/kg |
| Contact 100 mL arsenic solution with 385 | | | | |
| 1) 1 | gram ferric form zeolite | 325 | 0.400 | 6.0 |
| 2) 2 | gram ferric form zeolite | 260 | 0.417 | 6.3 |
| 3) 4 | gram ferric form zeolite | 145 | 0.400 | 6.0 |
| 4) 8 | gram ferric form zeolite submit solutions for analysis | 20 | 0.304 | 4.6 |
| 5) 1 | gram AAFS-50 | 20 | 2.433 | 36.5 |
| 6) 2 | gram AAFS-50 | 40 | 1.150 | 17.3 |
| 7) 4 | gram AAFS-50 | <3 | 0.637 | 9.6 |
| 8) 8 | gram AAFS-50 | <3 | 0.318 | 4.8 |

Note:
Calculation assumes 75/5 as equivalent weight of arsenic

Example 7

Industrial Scale Removal of Arsenic from an Aqueous Medium

The amount of chemically treated zeolite required for a particular use, and the size of the tank for commercial applications, are selected based on numerous parameters, including, but not limited to, average amount of trace elements in the aqueous medium, desired levels of reduction in arsenic, the water treatment facility size/capacity, and the type of chemically treated zeolite in use.

Predictable scale-up for the methods according to the present invention will be described in detail with respect to several parameters based on experimental data as described above and applied to a theoretical one million gallon per day (MGD) treatment facility. The aqueous medium contained an average of 20 ppb arsenic as arsenate and the desired reduction in concentration is to 10 ppb arsenic. The design flow rate of the tank is approximately 6 gal/ft$^2$. The zeolite is 20×40 mesh clinoptilolite.

Table 5 summarizes a typical scale-up calculation for an industrial sized system. As shown in the Table, removal of 5 ppb arsenic requires 189 kg zeolite per day or 69 tons of zeolite per year. At a flow rate of 694 gallons/min the effective tank size will be approximately 12 feet in diameter and at least 12 feet in height. A system designed to these specifications will require replacement of the tank and/or zeolite every 187 days (about every 6 months).

TABLE 5

Arsenic Design Analysis

| | | |
|---|---|---|
| Delta arsenic recovered | 15 umg/l | Assumption |
| umg arsenic/gallon | 56.7 umg/gallon | |
| Gallons/day | 1,000,000 gallons | Assumption |
| Liters/day | 3,785,000 liters | |
| Zeolite capacity | 300 mg As/kg zeolite | Assumption |
| mg arsenic/day recovered | 56,775 mg arsenic/day | |
| kilos zeolite loaded per day | 189 kilos | |
| kilos per year for disposal | 69,076 kilos | |
| Tons per year for disposal | 69 tons | |
| Design flow rate of tank | 6 gal./sq. ft. | Assumption |
| Flow rate of water to be treated | 694 gpm | |
| Area needed | 116 sq. ft. | |
| Diameter of tanks | 12 feet | |
| kilos of zeolite per cubic foot | 25 kilos | |
| kilos of zeolite per 1 foot depth | 2894 kilos | |
| days per foot of zeolite in tank | 15 days | |
| Velocity in tank | 0.80 ft/minute | |
| EBCT needed | 15 min. | Assumption |
| Depth of zeolite needed | 12 ft | |
| Tank Life | 187 days | |

Example 8

Pilot Studies on Arsenic Removal Using 4 or 10 Column In-Series Systems

Figure 9A:
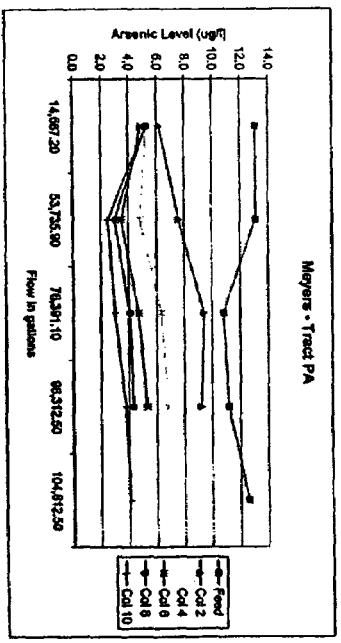
FIGS. 9A & 9B illustrate pilot study data for removal of arsenic from aqueous medium in accordance with one embodiment of the present invention.

The systems and methods of the present invention were used in two pilot studies to treat 104,000 gallons (FIG. 9A) or 66,000 gallons (FIG. 9B) water. Water at the Meyers-Track, PA, site was run through a series of 10 in-series 6"×8' sized columns each containing 5' of chemically treated zeolite, until a total of 104,812 gallons of water were treated. Arsenic levels were followed, and graphed. Note that the 10 column system removed arsenic from a feed level of arsenic in violation of the 10 ppb EPA arsenic level to discharge levels in the 2.5 ppb levels.

Figure 9B:
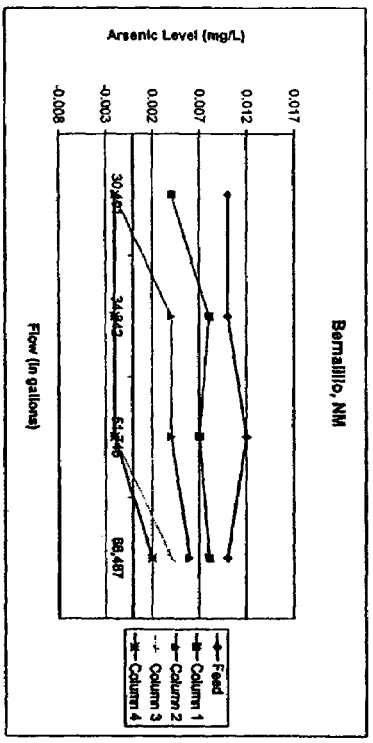

FIG. 9B illustrates a 4 column pilot study at Bernalilla, N. M., each column being 6"×8' in size and containing 8' of zeolite, to treat 66,000 gallons of water, where feed levels of arsenic were around 0.01 mg/L and discharge levels lowered to 0.002 mg/L.

The present Example again illustrates the utility of the present invention for removing arsenic from an aqueous medium, especially in light of the natural aqueous medium sources.

Example 9

Ferric Loaded Zeolite can be Regenerated Using an Acid Wash

Figure 11:
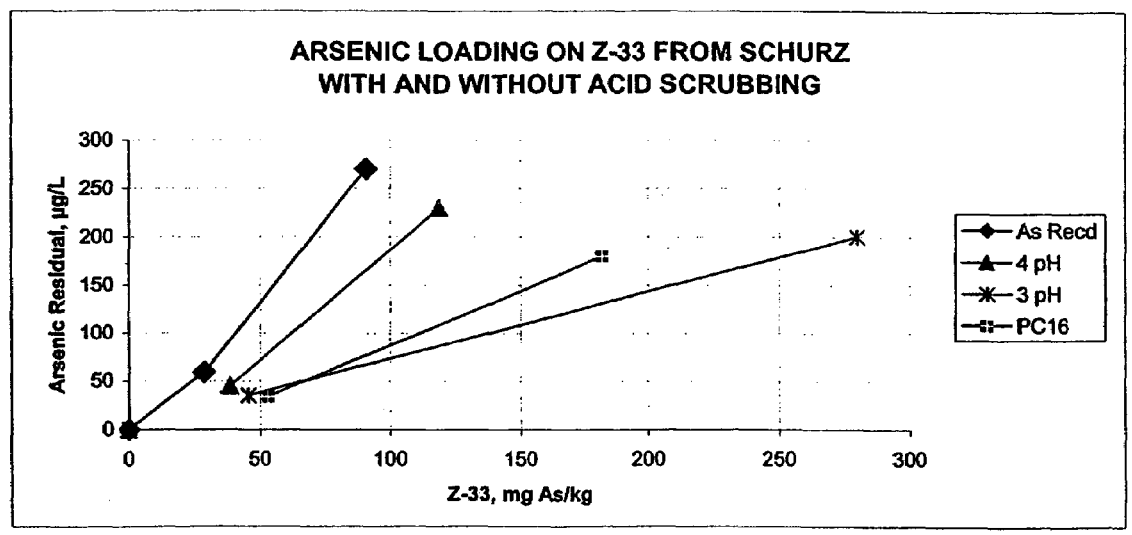
FIG. 11 illustrates the benefit of regenerating ferric loaded zeolite with a pH3 acid wash.

The systems and methods of the present invention were used to show the utility of regenerating ferric loaded zeolite. A batch test was performed as shown in FIG. 11, where ferric loaded zeolite was contacted with arsenic and treated with either neutral fluid, pH 4 acid wash or pH 3 acid wash, and the capacity of the material re-evaluated for arsenic removal. In more detail, 3.5 liters of arsenic containing aqueous media was contacted with 5 grams of ferric loaded zeolite for a 72 hour period. An acid wash was performed mid-way through the loading period.

The pH 3 acid wash was extremely effective at regenerating the ferric loaded zeolite for further use in the removal of arsenic from a target aqueous medium and allowed for maximal arsenic loading.

This Example provides illustrative data that a regenerating wash having a pH of 3 is useful in increasing the capacity of a chemically treated zeolite, especially as compared to no regeneration or an acid wash having a pH of 4.

It should be understood for purposes of this disclosure, that various changes and modifications may be made to the invention that are well within the scope of the invention. Numerous other changes may be made which will readily suggest themselves to those skilled in the art and which are encompassed in the spirit of the invention disclosed herein and as defined in the appended claims.

What is claimed is:

1. A method for optimizing the capacity of chemically treated zeolite for the removal of a target analyte from a drinking water supply, the method comprising:
   providing an amount of chemically treated zeolite, the chemically treated zeolite having a number of analyte binding sites absorptive for a target analyte in a drinking water supply;
   constraining the amount of chemically treated zeolite in a housing member for continuous contact with the drinking water supply;
   determining an amount of drinking water supply to pass through the chemically treated zeolite in order to load the analyte binding sites of the chemically treated zeolite with target analyte as well as other contaminates within the drinking water supply; and
   passing a regenerating wash through the loaded chemically treated zeolite to selectively strip the other contaminates, with a selected pH, from the analyte binding sites while the target analyte remains selectively bound to the analyte binding sites;
   wherein the stripped other contaminates provide additional analyte binding sites for target analyte within the drinking water supply thereby improving the capacity of the treated zeolite for the removal of the target analyte, and wherein the drinking water supply is discharged from the chemically treated zeolite with a level of analyte below a known threshold value.

2. The method of claim 1 further comprising:
   pre-determining the amount of chemically treated zeolite required to remove a target analyte from a known volume of drinking water supply.

3. The method of claim 2 further comprising:
   by-passing a portion of the known volume of drinking water supply from contacting the chemically treated zeolite, wherein the by-passed drinking water supply is combined with the drinking water supply discharged from the chemically treated zeolite, the combined drinking water supply having a level of analyte below a known threshold value.

4. The method of claim 3 wherein the known threshold value is the Maximum Contaminant Level (MCL) for the analyte.

5. The method of claim 1 wherein the target analyte is arsenic.

6. The method of claim 1 wherein the regenerating wash has a pH of from about 2.0 to about 3.5.

7. The method of claim 6 wherein the regenerating wash has a pH of from about 2.0 to about 3.1.

8. The method of claim 6 wherein the regenerating wash has a pH of about 3.0.

9. The method of claim 6 wherein the regenerating wash is sulfuric acid.

10. The method of claim 1 wherein the analyte loads less than about 99% percent of analyte binding sites when the regenerating wash is passed through the chemically treated zeolite.

11. A method for maintaining a level of a target analyte below a threshold level in a drinking water supply, the method comprising:
 contacting the drinking water supply to chemically treated zeolite, the chemically treated zeolite have a plurality of analyte binding sites having a first affinity for the target analyte and a second, different than the first, affinity for other contaminates within the drinking water supply;
 discharging the drinking water supply from the chemically treated zeolite wherein a number of analyte binding sites interact with and remove target analyte from the drinking water supply and a number of analyte binding sites interact with other contaminates and remove said other contaminates from the drinking water supply, wherein the target analyte level is below a threshold level for the drinking water supply;
 contacting a regenerating wash to the chemically treated zeolite to selectively remove the other contaminates from the analyte binding sites over the target analyte from the analyte binding sites, wherein the regenerating wash is provided at a pre-determined pH to selectively maintain the analyte binding site to analyte first affinity interaction but to interrupt the analyte binding site to contaminate at a second affinity interaction; and
 contacting the regenerated chemically treated zeolite with drinking water supply so that the analyte binding sites which were previously bound to contaminates can now interact with target analyte and maximize chemically treated zeolite capacity.

12. The method of claim 11 wherein the threshold value is the Maximum Contaminant Level (MCL) for the analyte.

13. The method of claim 11 wherein the regenerating wash has a pH of from about 2.0 to about 3.5.

14. The method of claim 11 wherein the regenerating wash has a pH of from about 2.0 to about 3.1.

15. The method of claim 11 wherein the regenerating wash has a pH of about 3.0.

16. The method of claim 11 wherein the target analyte is arsenic.

17. The method of claim 11 wherein the target analyte is uranium.

18. The method of claim 11 further comprising:
 by-passing a portion of the drinking water supply from contacting the chemically treated zeolite, wherein the by-passed drinking water supply is combined with the drinking water supply discharged from the chemically treated zeolite, the combined drinking water supply having a level of analyte below the threshold value.

19. The method of claim of claim 11 wherein the regenerating wash is sulfuric acid.

20. The method of claim 11 wherein about 50% of the analyte binding sites are bound to target analyte prior to contacting the chemically treated zeolite with regenerating wash.

* * * * *